Oct. 14, 1969　　C. H. LITTLE ET AL　　3,473,157
AUTOMATIC DRAFTING-DIGITIZING APPARATUS
Filed Dec. 23, 1965　　9 Sheets-Sheet 1

INVENTORS.
CHARLES HUBBARD LITTLE
WALDO H. KLIEVER
EUGENE L. WIEMELS
BY Hoffmann & Yount
ATTORNEYS.

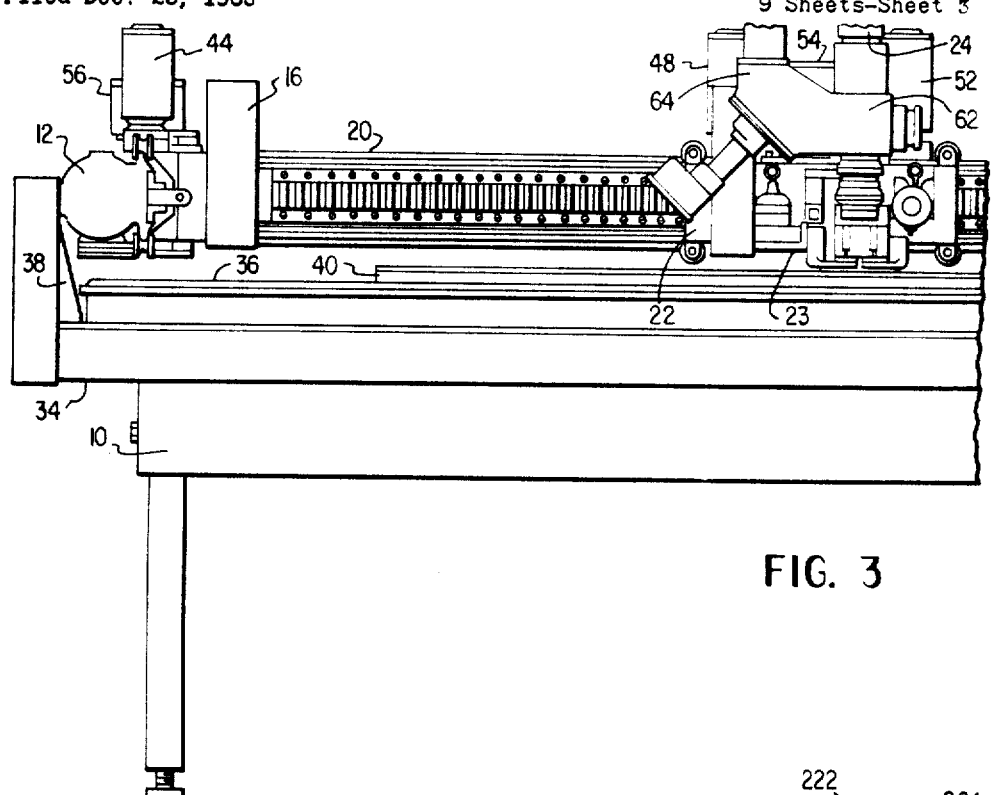
FIG. 3
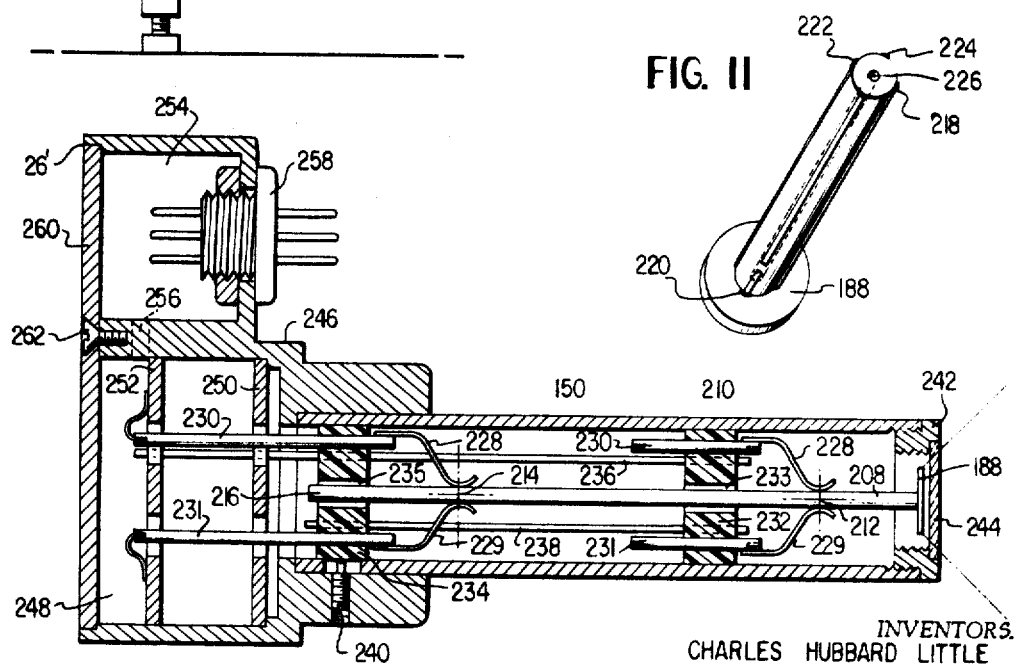
FIG. 11
FIG. 10
INVENTORS.
CHARLES HUBBARD LITTLE
WALDO H. KLIEVER
EUGENE L. WIEMELS
BY Hoffmann & Yount
ATTORNEYS.

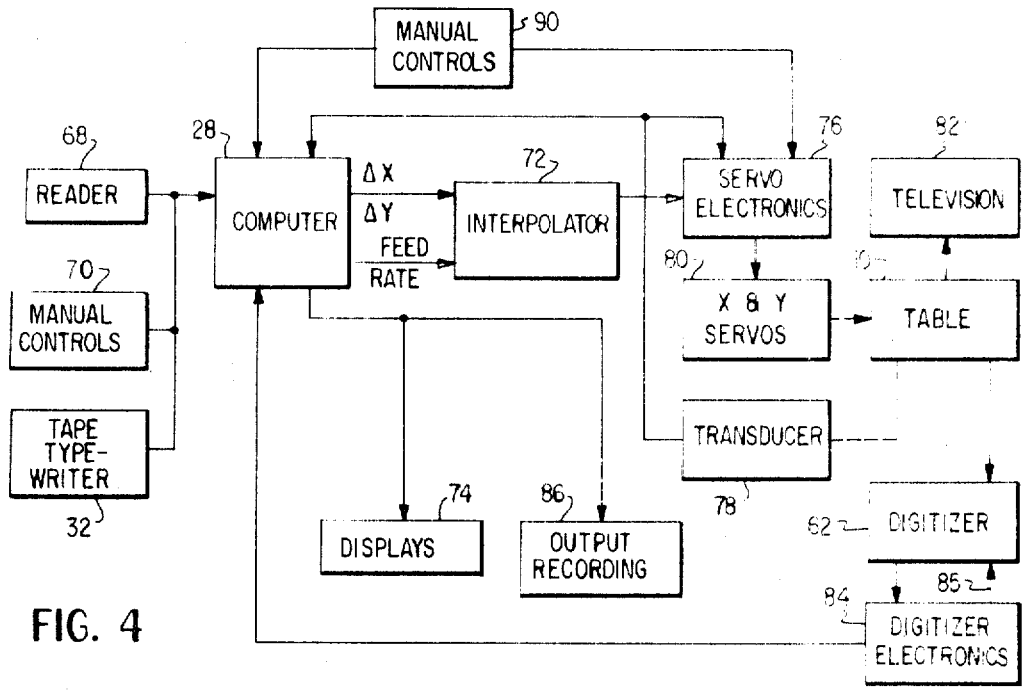
FIG. 4
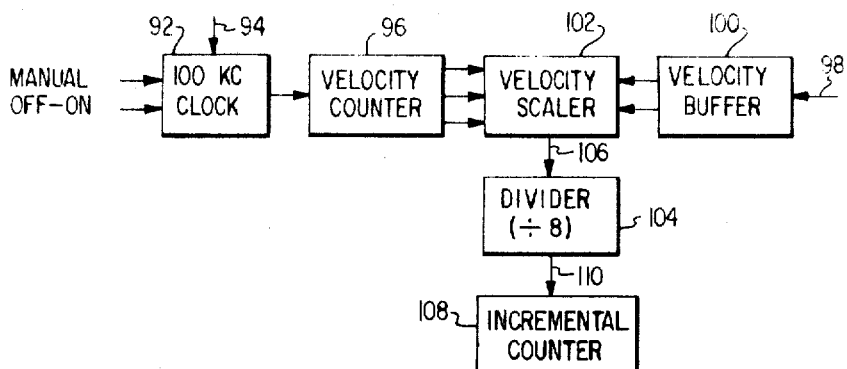
FIG. 5
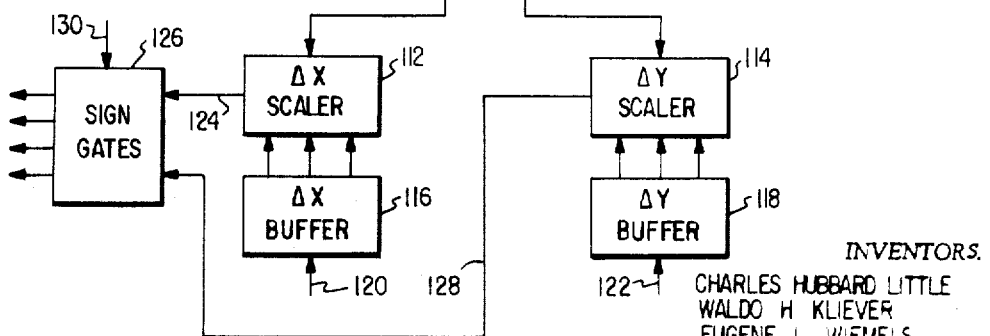

INVENTORS.
CHARLES HUBBARD LITTLE
WALDO H. KLIEVER
EUGENE L. WIEMELS
BY Hoffmann & Yount
ATTORNEYS.

INVENTORS.
CHARLES HUBBARD LITTLE
WALDO H. KLIEVER
EUGENE L. WIEMELS

BY *Hoffmann & Yount*

ATTORNEYS.

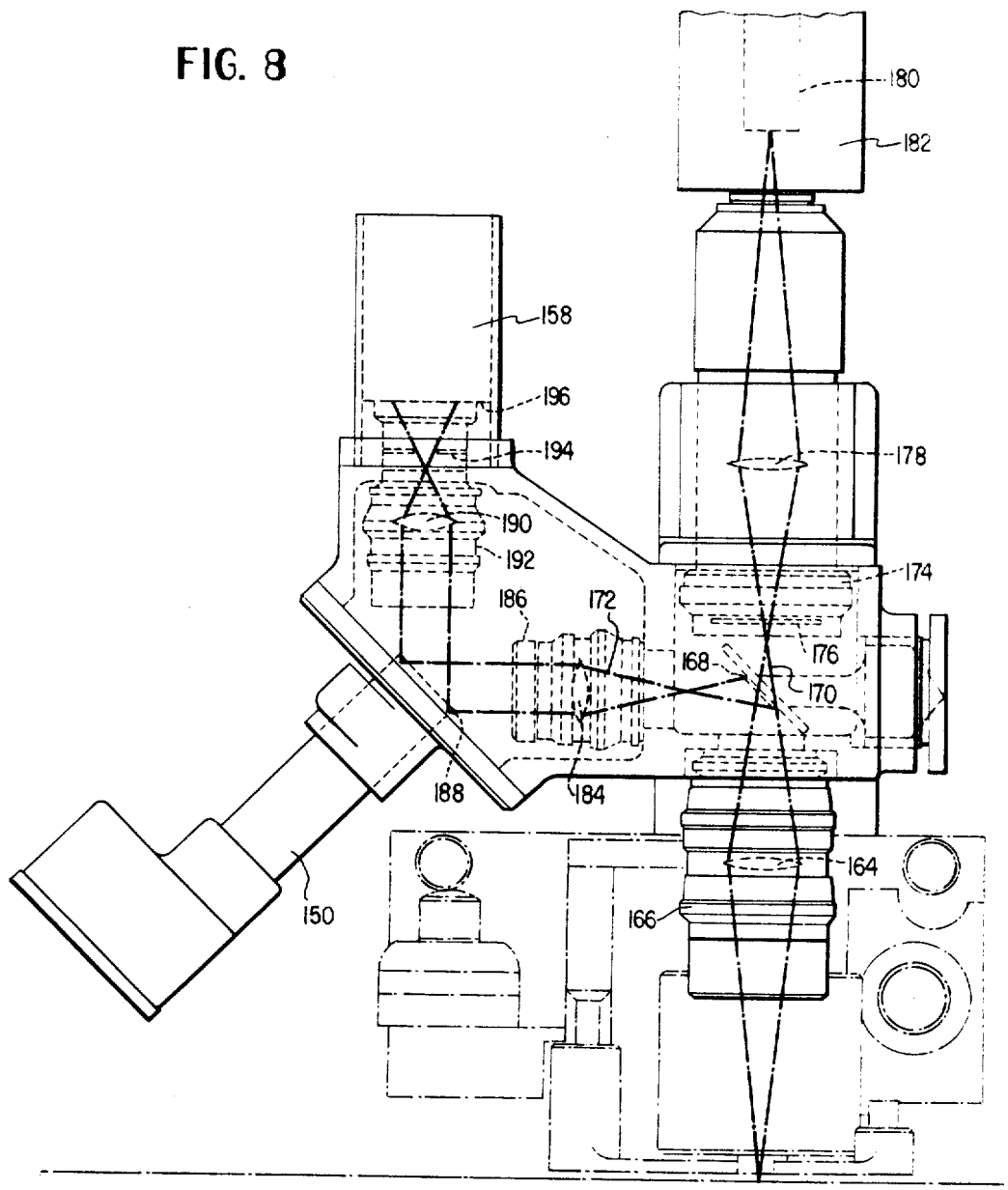

Oct. 14, 1969     C. H. LITTLE ET AL     3,473,157
AUTOMATIC DRAFTING-DIGITIZING APPARATUS
Filed Dec. 23, 1965     9 Sheets-Sheet 2
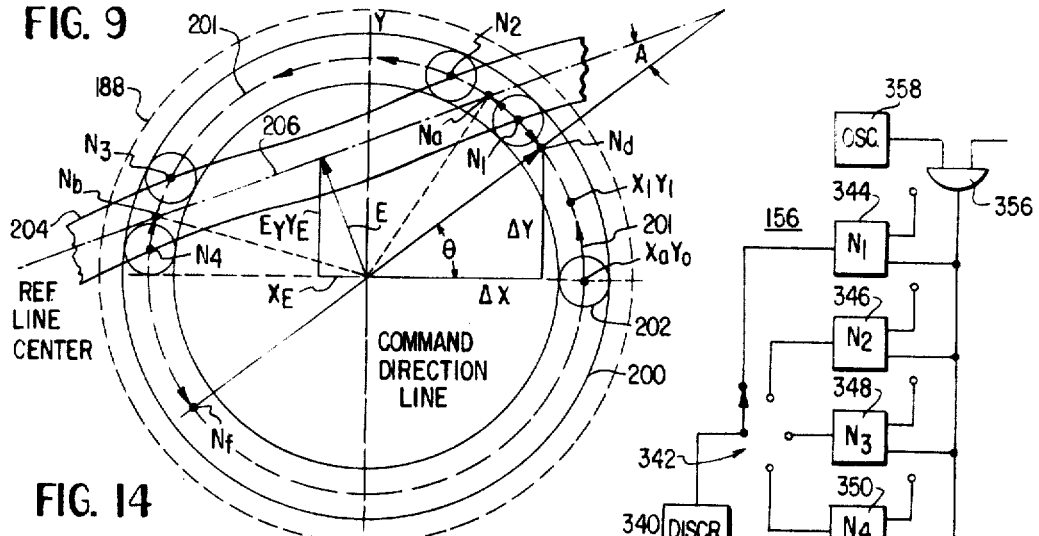
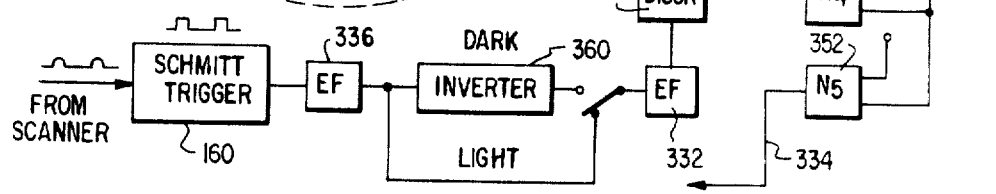
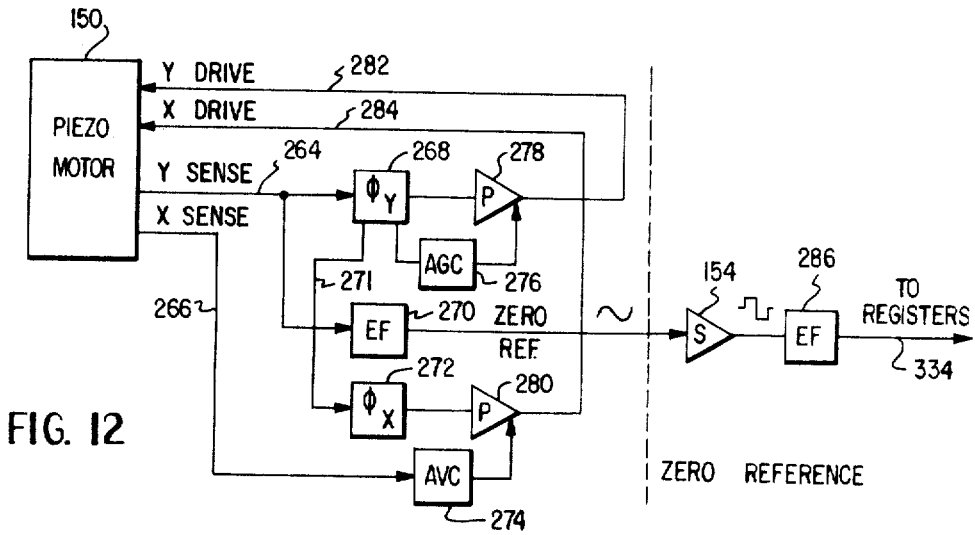
INVENTORS.
CHARLES HUBBARD LITTLE
WALDO H. KLIEVER
EUGENE L. WIEMELS
BY *Hoffmann & Yount*
ATTORNEYS.

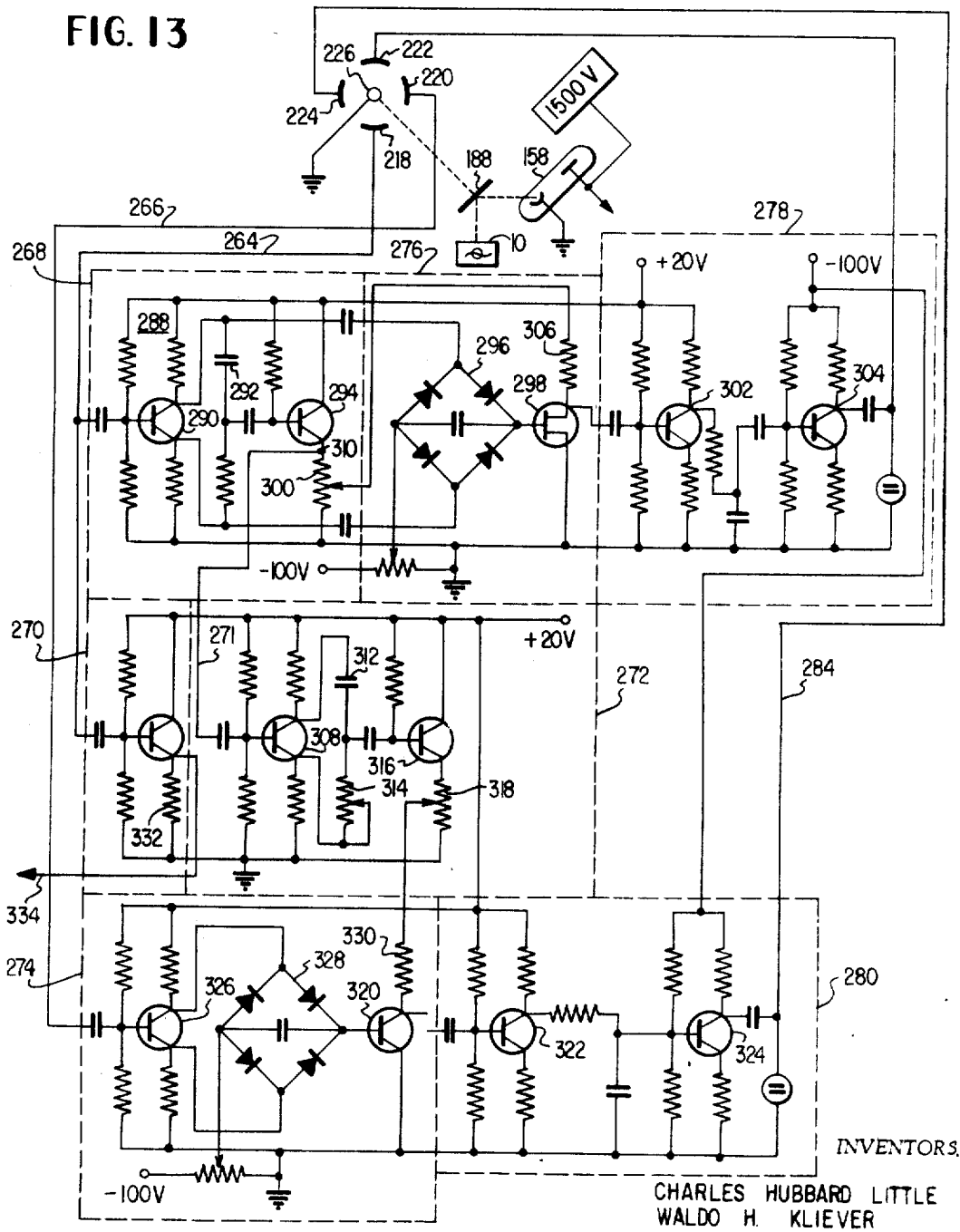

United States Patent Office 3,473,157
Patented Oct. 14, 1969

3,473,157
AUTOMATIC DRAFTING-DIGITIZING APPARATUS
Charles H. Little, Cleveland, and Waldo H. Kliever and Eugene L. Wiemels, Cleveland Heights, Ohio, assignors to Universal Drafting Machine Corporation, Bedford Heights, Ohio, a corporation of Ohio
Continuation-in-part of application Ser. No. 262,590, Mar. 4, 1963. This application Dec. 23, 1965, Ser. No. 516,059
Int. Cl. B43l *13/00;* G06f *15/20, 9/06;* G05b *19/42*
U.S. Cl. 340—172.5                      18 Claims

ABSTRACT OF THE DISCLOSURE

There is disclosed hereinafter a drafting-digitizing machine for automatically scribing information on sheet-like articles and for digitizing lines, curves, and the like that are scribed on or in sheet-like articles. The machine includes a support assembly for supporting the sheet-like articles and for supporting a scribing-scanning head. The head is provided with scribing tools and a photoelectric scanning assembly. In addition, the head is moved automatically by motive powered assemblies under the control of a computer having a plurality of digital input assemblies associated with it for providing a plurality of output signals. Output devices are disclosed for producing records concerning the operation of said scribing-scanning head, and an additional output member is provided whereon a TV picture of a line, curve, or the like on a sheet-like article may be observed by the machine operator.

---

This application is a continuation-in-part of our application Ser. No. 262,590 filed Mar. 4, 1963, now abandoned.

This invention relates to a computer controlled drafting-digitizing system that is responsive to digital input information to produce a drawn or scribed representation of such information in the form of lines, characters, or the like on sheet like articles, or the like; and is responsive to drawn or scribed information in the form of lines, characters, and the like, contained on sheet like articles, or the like to produce digital records and visual representations of such drawn or scribed information. This apparatus is capable of automatic, semi-automatic, and manual operation in both its drafting and its digitizing modes of operation.

In the preferred embodiment the drafting/digitizing machine is capable of responding to a plurality of sources of binary-coded and/or alphanumeric data instructions such as punched paper tape, magnetic tape, tape-typewriter, etc., to produce continuous or dashed straight lines, curves, circles, etc., mathematically generated designs such as loft lines, loft drawings, templates, etc., and mirror image or reverse drawings, etc., using pencils, pens, scribe tools, and the like on supported sheet like articles such as drafting paper, sheet metal, and the like.

The drafting/digitizing machine is capable, through the use of a unique electro-optical system of producing binary-coded, and/or alphanumeric data representing the true position and direction of all lines, curves, and other graphical representations that the machine is capable of drawing; the machine in its line following or digitizing mode of operation is also capable of following a border existing between two or more articles in the same manner as it follows graphical representations to produce a digital output. Also as a line-follower the machine, in the preferred embodiment provides its operator with a visual representation of the exact line, curve, etc., being followed as it is being followed.

A machine of this type is highly desirable in that it is capable of verifying numerical control machine-tool tapes by producing drawings; of translating mathematical formulae and equations into drawings; of producing three-dimensional perspective and isometric drawings; of scribing templates and inspection masters; of converting financial and statistical data into graphic presentations; of drawing topographical maps; of making drawings from computer data originated by laboratory equipment; and in general it is capable of producing a visual representation of coded information. Moreover, it is highly desirable in that it is capable of automatically following lines, figures and other symbolic information contained on blueprints, photostats, drawings and the like for producing the digital analog of the information seen by the machine so that this information may be used to control: machine tool operations; warehouse functions and machinery; and other subsequent computerized or automatic functions.

It is the primary object of this invention to provide a new and novel machine that is capable of producing highly accurate graphical representations of and from raw digital data at a high rate of speed, and to produce highly accurate digital and/or visual representations of a drawing or other marking made upon a sheet-like article at a high rate of speed.

It is another object of this invention to provide a new and novel machine capable of automatically semi-automatically or manually producing a drawing through computer control from a source of input information that may be binary-coded or alphanumeric data, and to produce automatically, semi-automatically, or manually a binary-coded or alphanumeric data record, and/or a visual picture of graphical and character information contained on a sheet-like article of impression bearing material.

It is another object of this invention to provide a computer controlled, automatic, high speed drafting instrumentality capable of producing a highly accurate drawn representation of digital data supplied to the inputs of and stored in the memories of the computer.

It is another object of this invention to provide a completely automatic electronic drafting device for producing a drawing in response to and representative of data processed in a computer and transferred from a plurality of sources where said plurality of sources include the storage of the computer, and include digital sources responsive to the position of scribing tools on the drawing.

It is the further object of this invention to provide a new and novel combination of circuits for matching the speed of a high rate storage and calculator device to a plurality of digital to analog conversion and control circuits utilized to control the movements and operations of a scribing tool in an automatic drafting machine.

It is another object of the present invention to provide a new and novel computer controlled automatic drafting instrumentality having manual controls to be utilized by the machine operator in conjunction with an automatic source of input data or exclusive of an automatic source of data input to thereby allow the operator to produce a drawing either manually or semi-automatically.

It is another object of this invention to provide a new and novel automatic drafting machine capable of presenting the machine operator with a visual representation of a portion of the drawing at a remote location as the drawing is being produced.

It is the further object of this invention to provide a device capable of automatically, rapidly, and accurately following a line or characters scribed on a sheet like article to produce an accurate coded representation, that does not contain machine hunt information in the output, of the line or character.

It is yet another object of this invention to provide a new and novel digitizing machine that is capable of automatically or semi-automatically or manually following a line, character, or other graphical representation marked on a sheet-like article to accurately produce a binary coded or alphanumerical data representation of the true position and direction of the line, character or graphical representation on the sheet-like article.

It is still another object of this invention to provide a new and novel digitizing machine that is capable of automatically following line and the like to produce a digital representation of the line's position and direction, and that is capable of recognizing and automatically responding to ambiguities in the line.

It is another object of this invention to provide an automatic digitizing device that is capable of providing an operator remotely located from the device with a visual picture of the information being digitized.

It is a further object of this invention to provide a unique electro-optical system for analyzing scribed information contained on a sheet-like article to produce output data representative of the position and direction of the scribed information on the article.

It is another object of this invention to provide a new and novel device for automatically moving an electro-optical scanner over and along scribed information on a sheet-like article to provide output data, representative of the position and direction of a segment of the scribed information as viewed within a coordinate system set up in the scanner, for recording, and for controlling the rate, direction and position of movement of said device.

It is still another object of this invention to provide means whereby positional information produced by an electro-optical system motor power means may be correlated with information representative of a line segment viewed by the electro-optical system to cause the electro-optical system to progressively follow the line under observation.

In order that the above and other objects of this invention may be clearly understood and readily carried into effect, the invention will be described with reference to the accompanying drawings in which:

FIGURE 3 is a side elevation of the section shown in FIGURE 2 and further shows the electro-optical equipment of the digitizing portion of the machine;

FIGURE 4 is a block diagram of the electrical and optical elements of the drafting/digitizing machine;

FIGURE 5 is a block diagram of the interpolator of FIGURE 4;

FIGURE 8 is a view of the photoelectric head utilized for providing a photo-optical output of the scribed information being digitized;

FIGURE 9 is a diagrammatic view of a segment of scribed information being digitized having a set of co-ordinates superimposed upon it;

FIGURE 10 is a side elevation of a part of the electro-optical system utilized to view the scribed area being digitized;

FIGURE 11 is a view showing a portion of the electro-optical system of FIGURE 10;

FIGURE 12 is a block diagram showing the electronics utilized to drive the optical elements shown in FIGURE 10;

FIGURE 13 is schematic diagram of the electronics of the system shown in block form in FIGURE 12; and FIGURE 14 is a block diagram showing the electro-optical systems output logic and a temporary storage.

Figure 1:
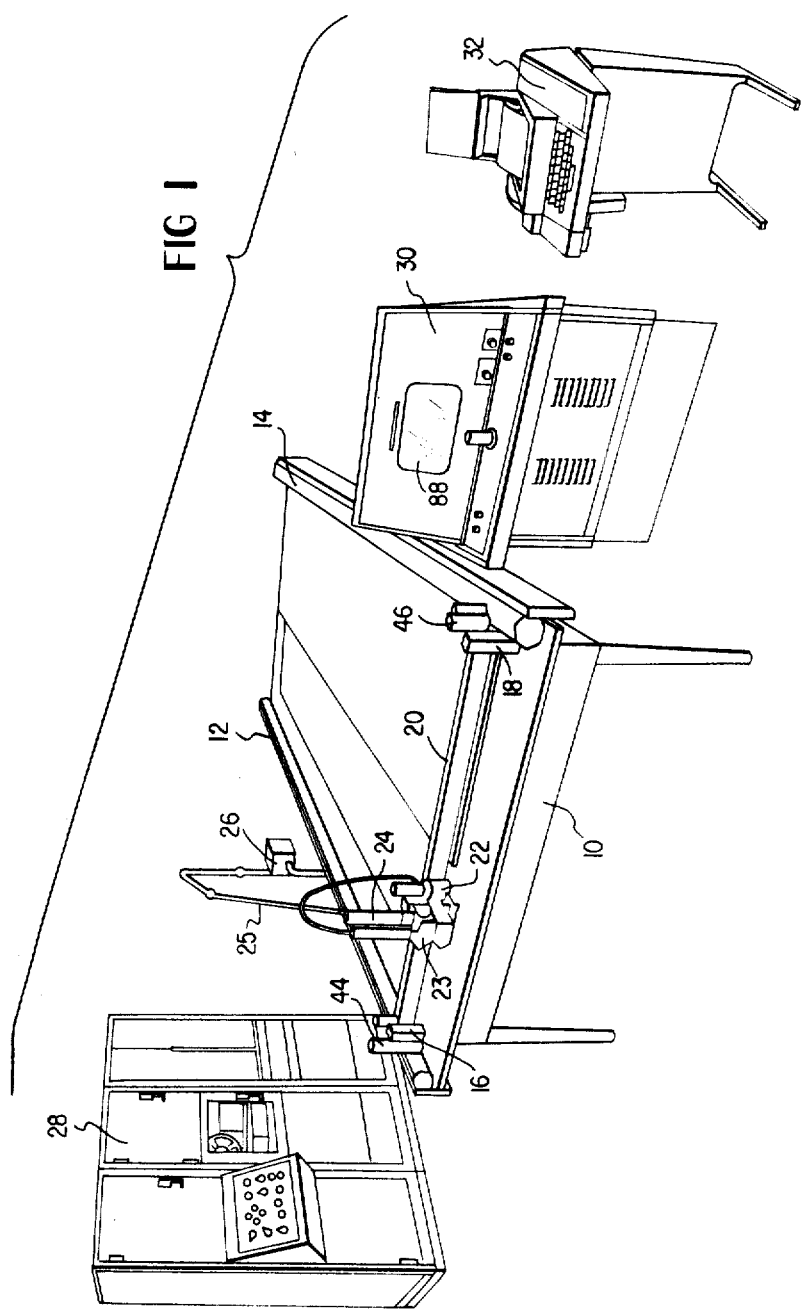
FIGURE 1 is a pictorial representation of the drafting/digitizing machine.

Referring now to FIGURE 1, the preferred embodiment of the drafting/digitizing machine and the major components of the machine are shown in pictorial form. The drafting/digitizing machine consists of several major subgroups, utilized for the purpose of producing a drawing and/or producing a digital record of lines and the like marked upon a drawing.

For this purpose, a table 10 is provided for supporting the sheet-like articles which are to be marked by this apparatus, or which bear markings that will be digitized by the apparatus. The table 10 will be described in greater detail below; however, it is the subject of our co-pending application and will therefore not be described in great detail. A pair of runway beams 12, 14 are shown mounted on the table 10. A pair of movable carriages 16 and 18 are mounted one each on the beams 12, 14 respectively for movement along the beams. A third beam, 20, is supported in and carried by the carriages 16 and 18. A third carriage, 22, is mounted for movement lengthwise of beam 20, where carriage 22 supports the drafting and digitizing instruments, indicated generally as the unit 23, that constitute part of this invention. The carriage 22 also supports a television camera 24, which is connected by a cable 25 with the camera electronics 26. The movable carriages 16, 18, and 22 are energized through electrical conductors contained within their respective beams. Other conductors are also carried in the beams for the purpose of transmitting signals to and from the drafting-digitizing unit 23 and other signal responsive devices mounted on the movable carriages. All electrical conductors contained within the beams are cable connected with other elements of the system such as a storage program control unit 28, and an operator's console 30.

The storage program control unit 28 also communicates with a tape typewriter unit 32, the function of which will be described subsequently.

In the preferred embodiment of the present invention, the stored program control 28 is a real-time, process-control computer suitable through the use of conversion circuitry to provide $\frac{1}{1000}$ of an inch controlled positioning of the movable carriages 16, 18 and 22. The unit 28 is a purchased unit, and is manufactured by the Digital Equipment Corporation. The computer has the capability of storing 4,096 words in its internal memory, and may be addressed through various input media such as punched tape, magnetic tape, a punched card reader, magnetic tape file, and the tape typewriter 32. As utilized in the preferred embodiment of this invention, the computer is addressed through a punched tape reader for automatic drafting operations, and is addressed from the drafting-digitizing unit 23 for automatic digitizing operations. In addition, the computer is addressed from the tape typewriter 32 for manual insertion into the computer programs to give semi-automatic control of drafting-digitizing operations, or through the use of the tape typewriter 32 to provide manual drafting-digitizing capability.

As an output unit, or that is, as a digitizing machine, the computer 28 may be utilized to print out on the tape typewriter 32, punch a paper tape by operating a tape punch, punch cards by operating a card punch, and producing magnetic tape outputs through magnetic recording.

The supporting table and movableable assemblies

The mechanical and electronic details of the construction and operation of the table 10, beams 12, 14 and 20, and the movable assemblies 16, 18, and 22 are given in our copending application Ser. No. 262,590, filed Mar. 4, 1963. However, in order to understand the operation of the drafting/digitizing machine of the present invention, within the mechanical framework of our copending application, a brief description of the table, beams, etc. will be given below.

Figure 2:
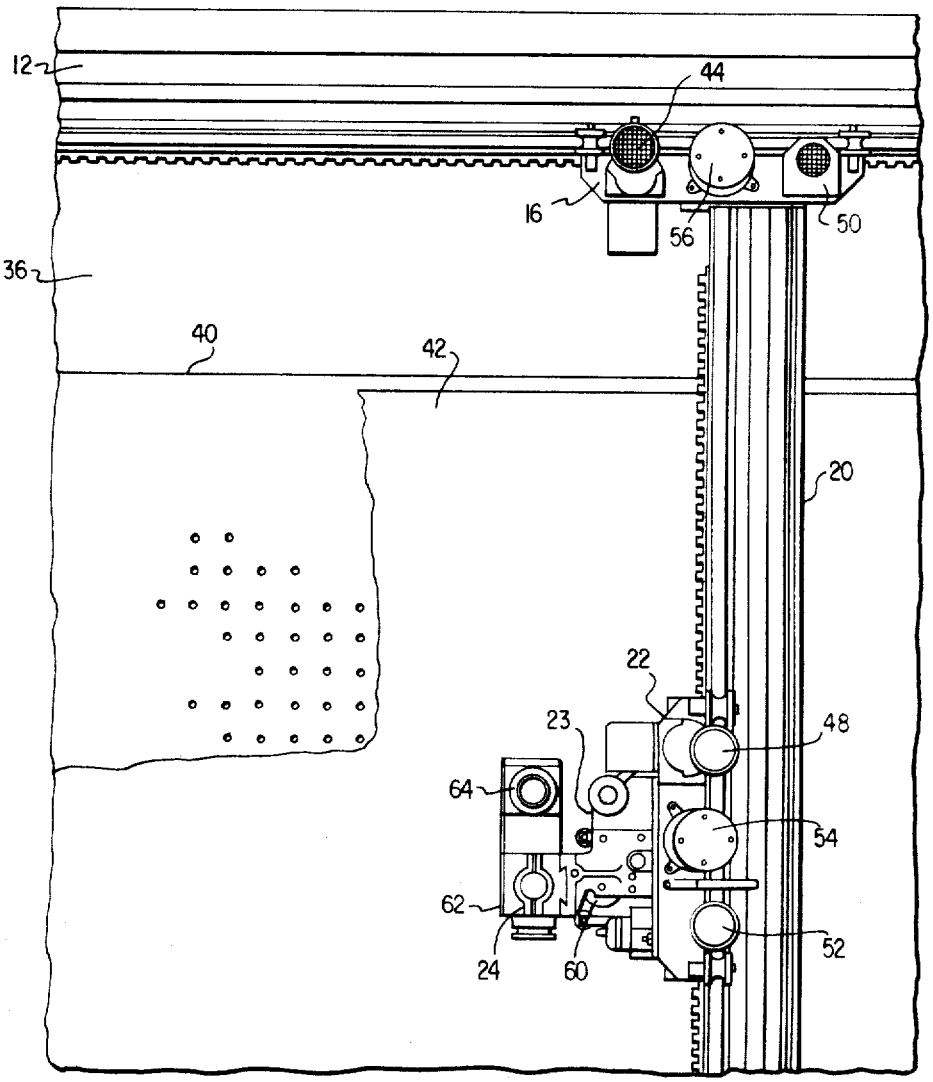
FIGURE 2 is a plan elevation of a section of the supporting means utilized for supporting the sheet-like article upon which lines and the like are scribed or are to be scribed and of the movable assemblies utilized for moving scribing tools and digitizing equipment.

Referring now to FIGURES 2 and 3, the movable carriage 22 is shown supported by and mounted for movement with and along the movable beam 20. The beam 20 is supported on and mounted for movement with a second powered carriage 16, located at one end of the beam 20 and is similarly supported for movement at the other end with a third powered carriage 18, see FIG. 1. The carriage 16 is mounted for movement along the beam 12. The beam 20, carriage 16 and the carriage 18 form a second movable assembly constrained to move at right angles to the direction of movement of the carriage 22.

The carriage 22 supports a plurality of drafting and digitizing instruments and also supports carriage drive and digitizing apparatus for moving the carriage along the beam 20 and for providing digital output information concerning the position of the carriage on the beam. In a like manner the carriages 16, 18, also support drive apparatus, and in addition a positional digitizing device is mounted on carriage 16.

The movable assemblies and beams are supported by the table 10. The table is provided with a plurality of channel members 34 for supporting a table top 36 and bracket members 38, only one of which is shown; details of the table construction are given in our copending application. The beams 12, 14 are rigidly attached to the bracekt members 38 so that the movable carriages lie substantially in a plane. The table top 36 also supports a vacuum chuck 40. The top of the chuck is used as a supporting surface for sheet-like articles such as drawing paper, sheet metal and the like. A sheet of marking material 42 is shown in FIGURE 2.

The carriages 16, 18, and 22 are powered by servo motors 44, 46 and 48 respectively. The servo motors are utilized for the purpose of driving their respective carriages along their respective beams to provide the drafting/digitizing apparatus 23 supported on carriage 22 with motion in both the X and Y directions. All servo motors are energized through current conductors carried by the beams 12, 14, and 20. In this manner the drafting/digitizing apparatus is caused to move to any point on the table. It will be obvious to those skilled in the art that a fourth beam could be supported by the carriage 22 so as to be mounted vertically perpendicular to the beam 20 to support a fourth powered carriage. In such an event the drafting/digitizing apparatus would be mounted on the fourth carriage to provide the system apparatus with the ability to move along three axes instead of the two axes shown in the drawings.

In the embodiment shown, the direction of movement of carriage 22 is arbitrarily designated as movement along the Y axis of a Cartesian coordinate system and movement along the beams 12, 14 is designated as movement along the X axis. In a like manner, any spot on a beam 12 or 14 may be designated as the zero point of the coordinate system and in the preferred embodiment this point was chosen as a stop located near the lower right hand corner of the table 10.

A synchro system is provided for maintaining beam 20 perpendicular to beams 12, 14. For this purpose a synchro transmitter 50 is mounted on carriage 16 and a synchro receiver 52 is mounted on carriage 22.

Incremental digital feedback information regarding the position of the drafting/digitizing apparatus on the table 10 is obtained from a pair of digital transducers 54, 56 which may be of the type described in our U.S. Patent No. 3,009,141 of Nov. 11, 1961. Transducer 54 is mounted for movement on carriage 22 and is keyed to beam 20, and transducer 56 is mounted on carriage 16 or in the alternative, may be mounted on carriage 18, and keyed to beam 12, or if the alternative is used, to beam 14. The transducers 54, 56 generate binary information indicative of the position of the carriages on the beams, their rate of travel, and their direction of travel. This information is applied through incremental accumulators to the computer 28 and is also applied to the servo motor electronics.

As stated the carriage 22 supports a plurality of instruments necessary for producing drawings on article 42, or in the alternative for providing digital output information relative to markings carried by article 42. The drafting-digitizing instruments are mounted in the drafting-digitizing unit 23, also referred to as the stylus head which is carried by and supported for vertical movement on the carriage 22. The stylus head mounts a stylus turret 60 over the sheet like article 42. The turret may contain one or more stylus members which may be pens or other scribers, and the like. The turret may be held in a fixed position by the stylus head. It may be indexable in discrete steps around an axis of movement within the stylus head, or it may rotate freely within the stylus head. The stylii are mounted for vertical movement in the turret 60. When they are activated to contact the article 42 they may be given linear or rotary motion relative to the article. The digitizing unit 62 comprising a photo-electric scanning unit 64 and the TV camera 24 is also supported by the stylus head 58 and carriage 22. A detailed discussion of the digitizing unit 62 will be given subsequently.

Systems control

Referring now to FIGURE 4, the input and output devices, the computer, the input-output electronics for the computer, and the table, drafting-digitizing apparatus, and related equipment have been shown in a simplified block diagram. It is the purpose of the apparatus and circuits shown in FIGURE 4 to convey information to and away from the drafting table, that is to say, it is the purpose of these circuits to supply information to cause a drawing or scribing operation to be performed on a sheet like article carried by the table 10, and for the instruments to scan a sheet-like article to convert information contained on the article in the form of characters, lines, and the like, into digital information and pass this information to the computer where it is processed and finally outputed as a recording or the like.

The computer 28 when used in a drafting operation, may receive information from any of several sources of input information as shown in FIGURE 4, e.g., the computer may accept the output of a reader 68, which may be coded in standard EIA code, binary coded decimal, word address format, and absolute or incremental. The reader 68 in the preferred embodiment is a punched tape reader, which operates at 300 c.p.s., however, the reader could also be a magnetic tape reader for operating of IBM 7-channel and 9-channel tapes, and may in fact be any conventional reader utilized as an input to a computer. The computer may be also addressed from the tape typewriter 32, shown in FIGURE 1 and also shown as a block in FIGURE 4, and may be further addressed through a plurality of switching controls 70, located at the operator's console 30 of FIG. 1. Most input information is entered through the reader 68 or the typewriter 32 or both.

The computer 28 is a general purpose parallel computer having a 4,096 word memory but which can be extended to a 32K word memory and is utilized for the purpose of controlling the operation of the drafting/digitizing apparatus mounted on carriage 22, in combination with an interpolator 72, connected to the output of the computer. Generally speaking, the computer utilizes input information to determine the direction of travel to be taken by the drafting/digitizing apparatus and the rate or feed rate at which the apparatus is to be moved. More specifically, the computer determines from input information the drafting instrumentalities are to draw lines, circles, parabolas, and the like, or that is to say, to perform linear interpolation, circular interpolation, or parabolic interpolation, which information is eventually transmitted to the servo mechanisms after digital to analog conversion. In addition, the computer is utilized to store alphanumeric and symbol information, which may be addressed through the use of $g$ and $d$ codes for the purpose of having the drafting instrumentalities draw characters and/or standardized symbols. The computer also is used to store scaling factors of 0.001x to 100.0x inches along both axes which allows independent scaling for each of the drawing axes.

The computer 28 may be also controlled to generate information utilizable by the drafting instrumentalities to produce dashed lines, center lines, phantom lines, and center locations, from either the tape or manual input modes by controlling the operation of the turret and stylii.

The servos can cause the drafting instrumentality to operate at a rate of anywhere from zero to 400 i.p.m. which rate is dependent upon the feed rate number determined by the computer in response to inputs from either the reader or typewriter. In addition, the reader can be caused to read ten blocks ahead, of information being processed for servo control to determine whether or not a sharp corner or other discontinuity is to be drawn, in which event the feed rate would be automatically changed to compensate for the discontinuity when it occurs. In this manner, the drafting instrumentalities can produce sharp corners without rounding and thus the problem of drafting overshoot is eliminated. Thus, the system is capable of handling tapes that are not provided with feed rates.

The computer 28 also may provide output displays at the control console 30, FIG. 1, or at the computer cabinet through the use of a display lighting panel 74, which can be utilized to indicate to the operator the position of the drafting and digitizing instrumentalities relative to the drawing or digitizing surface 42, and can be used to indicate the tape sequence.

The interpolator 72 will be described relative to a block diagram subsequently, but it is sufficient to say at this point that it provides both directional movement command signals and rate of movement command signals to the servo electronics 76. The servo electronics do not constitute part of this invention, and are described in detail in our copending application Ser. No. 262,590, filed Mar. 3, 1963. It is sufficient for the purpose of this invention to state that the servo electronics 76 receives binary information from the interpolator 72, and in addition, receive binary information from the transducers 54, 56, FIGS. 2, 3, which are shown as a transducer block 78 in FIG. 4. Input information from the interpolator and from the transducer is combined in the servo electronics 76, to produce a corrected signal which is utilized to modulate a sine wave or other continuous wave form. The continuous information signal is utilized to drive the servos 44, 46, and 48 which have been shown combined as the servos 80 in FIG. 4. The servos 80 are shown in FIG. 4 as applying a mechanical output to the table 10; the output shown is the drafting operation.

As mentioned heretofore, the carriage 22 also carries the digitizing unit 62 which is shown in block form in FIGURE 4. The digitizing unit will be referred to as the photoelectric head 62. Although as mentioned earlier, the digitizing unit 62 includes the television camera 66; the complete television system has been shown as a separate block in FIG. 4 and in FIG. 7 for convenience. The digitizing unit is a photoelectric system utilized for the purpose of converting information contained as markings such as lines, characters and the like on the table 10 into pulse information which is fed to the computer 28 through digitizer electronics 84. A feedback path 85 from the digitizer electronics to the unit 62 has been shown and will be described below, but basically feedback is utilized for controlling the mechanical operation of the digitizing unit. The electronics and digitizing unit will also be described in detail below. The signal output from the digitizer electronics 84 is fed to the computer 28 for the purpose of converting the information produced in the digitizer into standard EIA, binary coded decimal, and the like codes, which information is utilized to produce output recordings. An output recorder 86 is connected to the computer 28, and may be a paper tape punch, a typewriter, a magnetic tape recorder, a card punch or the like. In addition, information produced by the photoelectric head 62 and its electronics 84 is utilized to control the operations of the servos 80 in the same manner that information inputed from the typewriter 32 and reader 68 was used to control the servos 80.

The television system represented by the box 82 and shown mechanically connected to the table 10 in FIGURE 4 consists of a camera 66 as shown in FIGURE 2 of the drawings mounted on the photoelectric head 62; camera electronics including amplifying circuits and television routing circuits are supported on the table 10, and a receiver 88 is located at the operator's console 30, FIG. 1. The picture produced on the receiver 88 is an enlarged view of that portion of the sheet-like article being marked or being digitized, or that is that portion of the article that is directly under the digitizer unit 62. The manner in which the image is obtained will be described below.

Manual controls 90 for digitizing operations are also provided at the operator's console 30 and have been represented as a box in FIGURE 4. The manual controls 90 are connected to the computer 28 and the servo electronics 76. These controls and their operation will be described subsequently, but it is sufficient to say at this point that they are utilized for manually controlling the movements of the digitizer unit 62. They are used to drive the servo electronics and hence the digitizer follower unit 62 over the table surface 10 so that an operator can choose between allowing the digitizing unit to automatically output information relative to the marked article carried by the table 10 and in addition, they are utilized by the operator for correcting ambiguous situations occurring with respect to markings on the sheet-like article on table 10. Finally, they are utilized by the operator for printing out or causing the computer to print out information relative to points seen by the operator as viewed in his cathode ray tube display 88.

The interpolater 72 shown in FIGURE 4 has been shown in greater detail in FIGURE 5 as a block diagram in that the circuits utilized for the purpose of combining feed rate and distance of movement command information from the computer in each of the X and Y directions are in themselves old in the computer art. It is the function of the interpolater to combine information as to distance of travel to be covered by the drafting and digitizing instrumentalities on the table 10 with information as to the rate at which the instrumentalities are to move. To accomplish this object, the computer controls a plurality of scaling devices with binary information received from the reader and from the servo electronics in the case of drafting and from the table and servo electronics in the case of digitizing.

The computer operates a conventional 100 kc. clock 92 over an input-output transfer command line 94; the clock 92 is also provided with a manual off-on control at the operator's console. The clock is utilized for the purpose of generating a train of pulses at a constant repetition rate of 100 kc. where the pulses are utilized to drive a counter 96. The counter 96 is a conventional incremental counter and counts 100K pulses, and for any particular feed rate operation quits after counting for one feed rate number. Simultaneously, the computer 28 over a second input-output transfer line 98 feeds velocity command information known as the feed rate number to a velocity buffer 100. The velocity buffer 100 is a serial readin, parallel readout register and is utilized for time buffering the computer to subsequent electronics operating at lower speeds. More specifically, the buffer 100 outputs six bits to selectively operate a plurality of carry gates in a velocity scaler 102. The velocity scaler 102 is also operated on the other end by the velocity counter 96 where the counter 96 operates a proportional counter in the scaler; the output of the proportional counter is connected to the other inputs of the carry gates which in the preferred embodiment are utilized to provide 64 feed rate members.

The velocity scaler 102 in turn operates a conventional chain of binary flip-flops operating as a divider 104 over a line 106. In the preferred embodiment, divider 104 is a scale of eight divider although it is to be recognized that for the purpose of this description the scale of eight dividers is utilized in conjunction with a specific computer and with a specific servo electronics system and that for other systems utilizing different computers and different electronics might call for a different scale of division. The number outputted from the divider 104 is the feed rate number utilized by the servo electronics to drive the servo motors at some speed between zero and 400 inches per minute.

The divider 104 is operatively connected to an incremental counter 108 over line 110. The incremental counter is a series of binary flip flops and is utilized for the purpose of counting 256 pulses from the feed rate number. The output of the counter 108 is connected over a pair of lines to a pair of dimension scalers 112 and 114. The scalers 112 and 114 are similar to the scaler 102. The output of the incremental counter is applied to proportional counters in each of the two scalers.

Dimensional input information as to the distance to be traveled along either the X and Y axis is applied from the computer 28 to a pair of buffer registers 116 and 118 over input-output transfer lines 120 and 122 respectively. The buffers 116 and 118 are serial input, parallel output registers utilized for matching the computer to the interpolater and thence to the servo electronics. The buffers 116, 118 operate conventional carry gates in each of the two dimensional scalers 112, 114 where the carry gates are connected to the proportional counters mentioned previously. In this manner, the scalers 112 and 114 are set up by the computer to handle both dimensional and velocity information which information is utilized by the servo electronics.

The output of the scaler 112 is applied over a line 124 to a plurality of sine gates 126. The output of the scaler 114 is applied over a line 128 to the sine gates 126. The sine gates are conventional AND gates. For a two directional machine four gates are required, two gates for each direction of travel, thus giving the machine the capability to move in two directions along each axes of movement. The gates are selectively operated by the computer over a line 130 where the computer selects the direction of movement along the beams of FIGS. 1, 2, and 3 by selectively operating the gates 129. The sine gates are connected to the servo electronics 76 shown in FIGURE 4 of the drawings and described in detail in our copending application.

Figure 6:
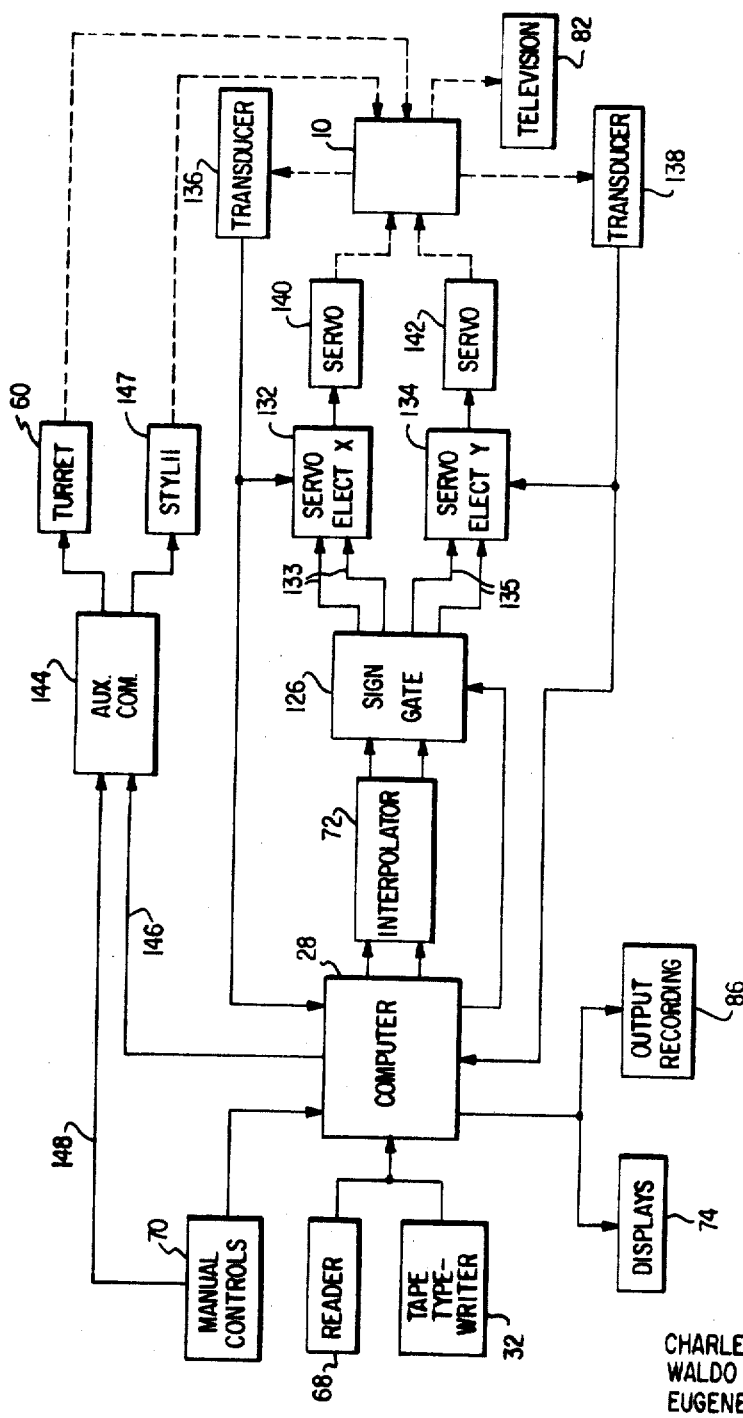
FIGURE 6 is a block diagram of the drafting elements used in the drafting/digitizing machines.

Referring now to FIGURE 6, the transfer of information for a drafting operation and the circuits utilized for the transfer are shown in block diagram form. The manual controls 70, reader 68 and typewriter 32 are the same as shown and described with reference to FIGURE 4 where they operate as input devices for the transferral of command information to the computer 28. As has been explained with reference to FIGURE 5, the computer 28 transfers information to the interpolater 72 which combines information as to feed rate number and dimensional movement along two axes and which is also utilized for the purpose of buffering between the computer and servo electronics. Servo command data is outputted from the interpolater 72 through the sine gates 126 to two separate servo electronic units 132, 134 along the signal lines 133, 135 respectively. The units 132, 134 were shown as the combined unit 76 in FIG. 4. As has been stated heretofore, the operation of the servo electronic units is fully described in our copending application. A brief description of their operation will be given for the purpose of understanding the operation of this invention.

Both servo electronics 132 and servo electronics 134 are similar in their construction and operation and are utilized for the purpose of converting binary information to sinusoidal or other continuous information for driving the respective servos. The units 132 and 134 are also connected to a pair of digital transducers 136 and 138 respectively where the transducers are mechanically connected to the table 10 to produce digital information representative of the position and rate of travel of the servos over the table. This information is combined with command information from the computer in the servo electronics and is counted and applied to control a pair of modulators which modulators provide continuous output signals corresponding to the digital information applied to the counters. The modulators are operatively connected to a pair of servos 140 and 142 through conventional amplifiers where the servo 140 is connected in the output of the servo electronics 132 and the servo 142 is connected in the output of the servo electronics 134.

The digital transducers 136, 138 are also connected to the computer 28. The computer utilizes the transducer signals to provide a numerical display at its output apparatus 74 of the position of the drafting instrumentalities on the table. In a like manner, the computer 28 can also operate output recorders 86, as mentioned earlier, for the purpose of recording the position of the drafting instrumentalities as they are moved over the table.

The computer 28 is also used to operate auxiliary command circuits 144 over a line 146. The auxiliary command circuits 144 supply operating commands to the stylus turret 60 to cause it to be indexed or rotated, and they supply stylus up-down and rotate signals to stylii 147 carried in the turret 60. The manual control panel 70 is provided with stylus and stylus turret override switches. These switches are used by the operator over command line 148 to override computer control of the named functions.

Figure 7:
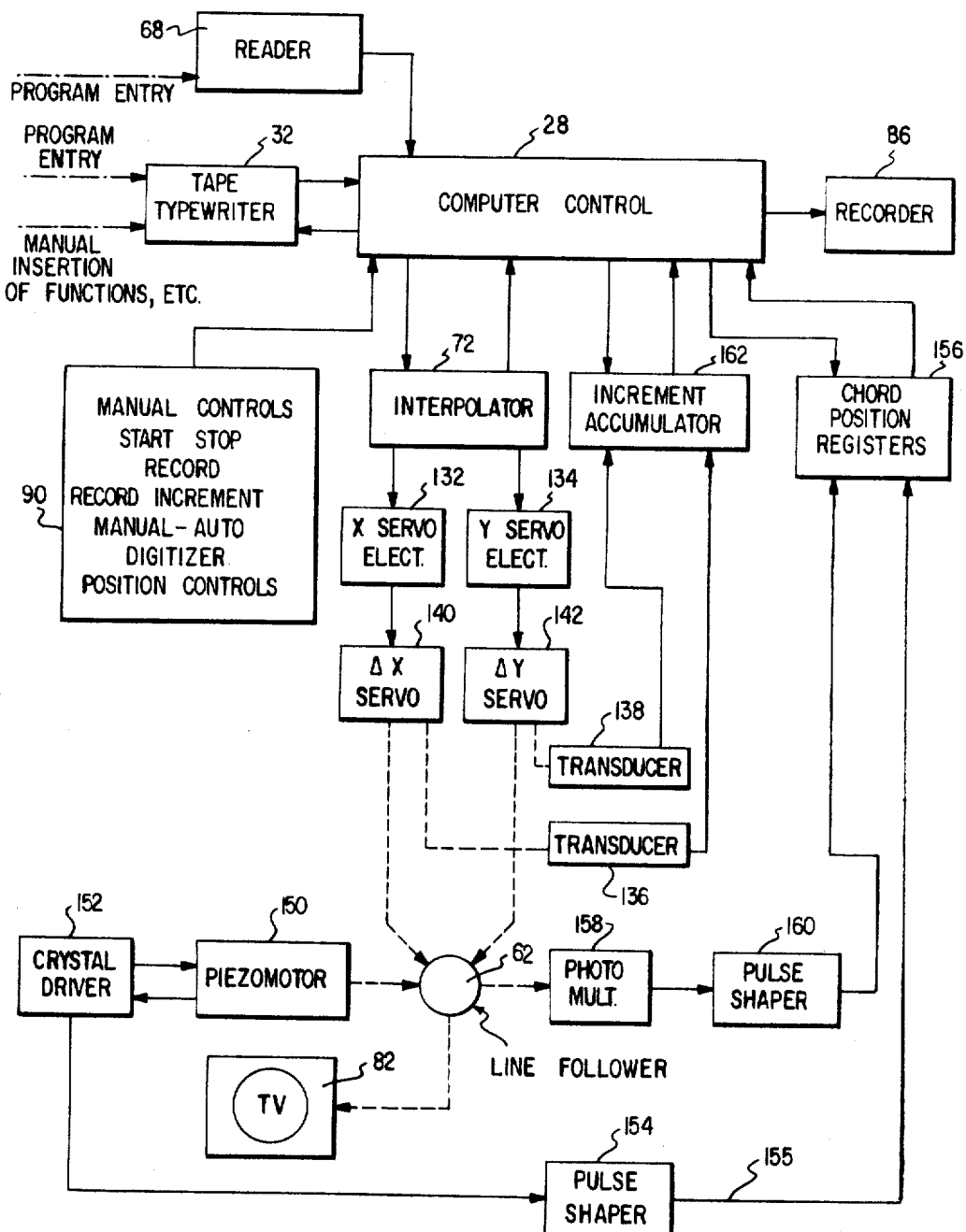
FIGURE 7 is a block diagram of the digitizing elements of the drafting/digitizing machines.

Referring now to FIGURE 7, a preferred embodiment of the digitizing apparatus and electronics that constitute a part of this invention is shown in block diagram form. The digitizer system 62 will hereinafter be referred to as either the photoelectric head, scanning unit or line follower 62. The scanning unit is mounted for movement over a surface containing a marking or markings such as lines. The photoelectric head 62 includes an optical system which is designed so that in any given scanning period a discrete portion of the total surface of the article 42 of FIG. 1 is under the photoelectric head 62. Thus, the scanning unit 62 views a discrete segment of a line, where the line may be a single line or one of a plurality of lines, in any given scanning period. The manner in which the photoelectric head 62 is made to move so as to constantly view different and overlapping discrete elements of the line will be described below. It is sufficient for the purpose of describing the digitizing apparatus generally to state that the output of the line follower 62 is such as to produce digital information that is utilized in conjunction with a second source of such information to cause the powered carriages 16, 18, 22 of FIG. 1 to drive the photoelectric head 62 in discrete steps of 0.0010 inch over and along a line where the photoelectric head 62 views a round area having a diameter of approximately 0.012 inch as the area moves around the inside periphery of a circle having a diameter of 0.080 inch in a scanning cycle. A scanning cycle is defined as that time it takes the round area to make one complete sweep within the larger circle. The round area and larger circle are shown in FIG. 10 and a full explanation of a scanning cycle will appear below. It will, of course, be understood that other sized stepping movements and scanning configurations could be substituted for those utilized in the preferred embodiment.

The photoelectric head 62 determines the position and direction of a line segment, i.e., the portion of the line, located within the total area under the photoelectric head during a scanning cycle, and the head 10 provides output information pertaining to the position and direction of the line segment within said total area; and it provides an electronic reference signal generated by an optical system contained within the photoelectric head for the purpose of orienting the computer 28 as to the position and direction of a line as seen by the photoelectric head. The optical elements of the photoelectric head 62 are mechanically coupled to a piezomotor 150 where the motor 150 is driven by a crystal driver 152. The piezomotor 150 consists of piezoelectric ceramic having a mirror mounted on the end thereof where the mirror is included as part of the optical path within the photoelectric head 62. The operation and structural details of the piezomotor 150 and crystal driver 152 will be described in greater detail subsequently but it is pertinent to say at this point that the piezomotor 150 is fundamental to the operation of the line follower in that it functions when driven by the crystal driver 152 so as to define the geometric configuration and area of a given incremental scanning step so as to cause the photoelectric head 62 to provide informational data representative of the position and direction of line segment under observation during an incremental step. The crystal driver 152 produces the reference signal mentioned above, which signal is applied to a pulse shaper 154 where it is squared and applied over a reference signal line 155 to the input of a chord position register 156 where the reference signal is temporarily stored.

The round area being viewed by the line follower 62 as the area scans the line segment within the larger circle produces signals every time the round area crosses the line. These signals are converted into their electrical equivalent by a photomultiplier tube 158. The photomultiplier tube 158 is mechanically part of the line follower 62 and has been shown as a separate block in FIGURE 7 for convenience only. The electrical pulses produced by the photomultiplier 158 are squared in a pulse shaper 160 and stored in the chord position register 156. The operation and details of the pulse shapers 154 and 160 and the chord position register 156 will be described in greater detail below. They are utilized to produce binary information pertaining to the line being followed to be used by the computer 28 so that the computer may cause the output recorder 86 to produce a permanent record of the position and direction of the line segment scanned, and to allow the computer to command the direction, rate and distance of movement of the scanning head 62.

The informational data read out of the chord register 156 by the computer 28 is averaged by the computer 28 to produce a mathematical straight line approximation of the line segment seen by the photoelectric head 62. Since the line segment viewed by the photoelectric head 62 is extremely small, and in the preferred embodiment of the invention consisted of that portion of the total line that intersects a circle of 0.080 inch diameter at two points on the circumference of the circle, the approximation to a straight line is extremely accurate because the longest chord from which positional and directional data is obtained is at most 0.080 inch in length.

As stated heretofore, the computer 28 produces incremental information which is utilized to step the photoelectric head 62 forward to scan subsequent discrete areas along the line being followed. As has been stated heretofore, the photoelectric head 62 is mounted for movement on carriage 22. FIGURES 1, 2, 3, and is caused to move through the operation of the X and Y servos 140, 142 as described with reference to FIG. 6. For digitizing operations, the carriages are completely controlled as to direction, rate and distance of operation by the computer 28 through its control of the servos. This operation is different from the drafting operation in that the primary source of information supplied to the computer originates from the drawing or other marked article. The computer 28 provides binary data output to the interpolator 72 which data is representative of the position and direction of the approximation of the line segment in the area under observation and the position of the servos 140 and 142. That information consists of the deviation of the line segment from the direction of travel of the line follower 62 as computed with respect to the next preceding approximation of a line segment. The computer 28 calculates this deviation signal and provides correctional output information to the interpolator 72 which information is utilized to drive the servos 140 and 142 through their respective input electronic units 132 and 134. A mechanical connection is shown between the servos 140 and 142 to the scanner unit 62 for the purpose of indicating that the servos control the direction of movement of the scanner unit. In order to compute the deviational signal, the transducers 136 and 138 provide continuous output binary representations of the actual position of the servos 140 and 142 relative to the line being followed which position is stored in an increment accumulator 162 and is utilized by the computer 28 in conjunction with the line segment information produced by the photoelectric head 62 to determine the true position of the line and to drive the photoelectric head 62 to that position. The transducers 136 and 138 have been shown connected to the servos 140, 142 in FIG. 7, but in actual practice they operate off of the beams as described above.

The increment accumulator 162 may consist of any conventional counting device such as a conventional flip-flop counter; in the preferred embodiment of this invention it was capable of counting 6667 pulses per second.

The line follower is, in its normal state, automatic in operation in that it will follow a line from its beginning to its end at a rate of 100 i.p.m. or less while maintaining accuracies of 0.003 inch. It is necessary for the follower to also have a manual control for the purpose of resolving ambiguities and for initiating a line following operation. However, within limits, the line follower can automatically resolve some ambiguities and in addition can hunt for new lines to be followed. Ambiguities are defined to mean sharp corners occurring and returning within a given scanning area; they are also defined to include the crossing of two lines in a scan area, a T'ing of lines and the like.

When the computer 28 determines from the information inputed to it through the chord position registers 156 that an ambiguity exists, the computer will cause the line-follower 62 to stop if more than 4 points intersect the circumference of the large circle within which the viewing or scanning circle moves. In this event, the computer will cause the tape typewriter 32 to print out the coordinates existing at the point of ambiguity, and at the same time will shift control of the digitizing apparatus to the manual controls 90. Under normal conditions of operation a line having dimensions will intersect the circumference of the large circle at four points. Thus, ambiguities exist whenever more than or less than 4 points are found in the large circle. Examples of ambiguities of more than 4 points are two lines intersecting within the circle (8 points), parallel lines of close proximity existing within the viewing circle (8 points), and the like.

On the other hand, if the ambiguity consists of broken lines or the end of a line, the computer will notice less than four line crossings or, that is, less than 4 points within the circle; under these circumstances, the computer will stop data printout on the recorder 86, and will cause the servos to continue moving along the direction of travel at the time the condition was detected. After any given number of scans, depending upon incrementing, if four points are again detected, then normal automatic operation continues. On the other hand, if less than four points are not detected, then the servos are automatically stopped by the computer and control is shifted to manual.

The third common type of ambiguity consists of angle breaks, or i.e., the sharp corners referred to above. As defined above, angle breaks are defined as sharp corners occurring and returning within a given scanning area. Within limits, the digitizing apparatus will automatically follow angle breaks, however, in some cases, the angle is of such an acute value that it is impossible for the machine to follow it, in which case, the machine automatically stops and switches over to the manual mode of operation.

The line follower is provided, in the preferred embodiment, with a manual mode of operation whereby an operator may override the computer control of the machine or the computer may switch over to manual as defined above for the purpose of producing data representing the solution of ambiguities and for initiating individual line following operations. To perform the mentioned functions the operator steers the line follower 62 with a plurality of controls located at the control console 90. He can order the computer 28 to move the photoelectric head 62 to any desired position over the line bearing article. The operator's controls include rough and fine photoelectric head positioning controls such as a joy stick and thumbwheels. The operator is also provided with a manual-automatic control switch, a start-stop control, record controls, incrementing controls and the like. The operator is further provided with an enlarged picture of the total area contained within the viewing range of the line follower 62 on the TV receiver 82. The TV receiver 82 obtains its display information from the photoelectric head 62 where the display information is such that the operator sees an enlarged view of the image seen by an optical system located in the photoelectric head 62. The manner in which this image is obtained in the preferred embodiment will be described subsequently.

In practice, the operator manually moves the photoelectric head 62 to a starting position by operating the joy stick and thumbwheels. He then depresses record and increment keys on the program tape typewriter 32. The output from the tape typewriter 32 is read into the computer 28 where the information is utilized by the computer to move the photoelectric head 62 and to provide output information that is recorded on the recorder 86. If the line follower is in its automatic mode, it will follow the chosen line automatically. Alternatively, the operator may desire to manually follow the chosen line or to resolve an ambiguity, in which case the line follower will move one incremental step after the operator has depressed the record and increment key and then stop. The operator then can manually correct the position of the photoelectric head 62 to be precisely placed on the line. The operator can also control the feed rate or that is the incremental stepping of scanner unit 62 to larger increments than the 0.001 inch movement stated heretofore.

The operator, in the preferred embodiment, can by placing the line follower in a "record only" mode freely wheel the scanner unit 62 to whatever position he desires. During both manual and automatic operation, data representative of the movements of the photoelectric unit 62 are recorded on the recorder 86. Thus, it will be obvious that the operator can control the movements of the line follower when an ambiguity occurs by instructing the follower to stop or when its stops automatically, whereupon he can manually resolve the ambiguity and return the follower to its automatic mode of operation.

Referring now to FIGURE 8, the photoelectric head 62 of the automatic digitizing apparatus is shown in a side elevational view. The photoelectric head 62 looks at an image of a portion of the article containing lines or the like through a corrected lens 164 mounted in a movable and focusable lens-holder 166. In the preferred embodiment, the area under the scanner unit 62 is illuminated with artificial light by four light projectors, not shown, mounted on the photoelectric head 62. It will be understood that various geometrical shapes of various sizes may be observed by the scanner unit, and the size and shape of the objective is a function of the degree of accuracy desired in the information output of the system.

The image seen by the lens is optically passed through and reflected off of a conventional beam splitter 168 to create two optical paths, 170 and 172. The image on the path 170 is magnified and utilized for the purpose of providing the operator with an image of the area under the lens 166. The second optical path 172, or that is the reflected image, is utilized to produce an electrical signal indicating the position of a line segment in the area under the lens system 166. The beam splitter 168 passes a direct image of the area under observation along optical path 170 to a lens system 174 which includes a reticle 176, as a sighting device. The image formed by the lens system 166 is focused on the reticle 176 and is passed from the reticle to a corrected lens 178 which focuses the image onto the target of an orthicon tube 180 or its equivalent in a TV camera 182 to create a TV picture of the image seen by the lens system 166.

As an alternative to the TV camera on the path 170 a telescopic arrangement may be substituted. In such a case, the image focused on the target 180 of the Orthicon would be focussed on a corrected lens system utilized for altering the light path 170 by an angle of approximately 90°. The combined light path 170 would be similar to a periscope in reverse. In such a case a viewer mounted on one of the movable carriages 16 or 18 of FIG. 1 could be focused on the light path 170, and in fact would be a continuation of the path. Thus, an image of the area under the photoelectric head 62 can be made available to an operator positioned at the side of the table 10.

The image reflected off the beam splitter 168 along the optical path 172 is focused by a corrected lens 184 mounted in a movable and focusable lens holder 186 onto a mirror 188. The mirror 188 reflects an image at an angle of 90 degrees through a third corrected lens 190 contained within a third movable and focusable lens holder 192, through a pinhole diaphragm 194 onto a target 196 of the photomultiplier tube 158. Since the diaphragm 194 is of the pinhole type it will only allow a portion of the beam of light reflected from the mirror 188 to register upon the photomultiplier target 196. The photomultiplier tube 158 is of conventional design and is utilized to produce an electrical signal output that will depend on the intensity of light reflected onto its target electrode 196. Thus, in the preferred embodiment, the photomultiplier 198 will pulse every time the intensity of the beam, reflected off the mirror 188 along the path 172, changes.

In operation, the corrected lens 164 forms an image of a circle 200, as shown in FIGURE 9, having a diameter of 0.080 inch and it is this image that the operator sees a magnified version of on his TV receiver 82 through the use of the orthicon 180. In actual practice the lens system 166 sees an area larger than the circle 200, FIG. 9, and the larger area is magnified and displayed on the receiver 82. The circle 200 is actually produced by the corrected lens 186 and exists only along the optical path 172. But for the purpose of a description of an operational embodiment of this invention, it will be assumed that the lens system 166 images the circular area represented by the circle 200. The area as viewed by the photomultiplier tube 198 and eventually by the computer 28 as will be described below is different in that it is determined by the size of the opening in the pinhole diaphragm 194. It, in the preferred embodiment, consists of a circle 202 having a diameter of approximately 0.012 inch, where the outside perimeter of this smaller circle is made tangential to the inside perimeter of the circular image (circle 200) seen by the lens system 166. If the entire image of the circle 200 were focused on the PM tube 158, usable information could not be obtained in the PM tube output. For this reason, the mirror 188 is caused to wobble in such a manner that the circle 202 appears to be rotating around the inside perimeter of circle 200. The manner in which the mirror 86 is caused to wobble will be described below. The effect of the rotating circle 202 is achieved through the interaction of the mirror 188, the fixed angle of reflection along the optical path 172, and the use of the pinhole diaphragm 194. The effect of the rotating spot is important in that, if a line is assumed to exist in the field of vision of the lens system 166, that line must enter circle 200 at a definite point on its circumference and leave the field of vision at some other definite point on its circumference. The line will reflect light of a different intensity than the material upon which it is drawn. Therefore a beam of reflected light will change in intensity, if it moves in a circular path within circle 200, every time it intercepts and leaves the line. This light is utilized in the photomultiplier tube 158 to produce pulses of electrical energy.

Referring now to FIGURE 9, a segment of a line 204, representing a line that is being followed, is shown as an image on the surface of the mirror 188. The circle 200 seen as an image by the lens 166 is shown having a Cartesian coordinate system superimposed on it, and is shown as an image on the surface of mirror 188 along with the image of the line segment 204. This is the total image, with the exception of those portions of the line segment 204 lying outside the perimeter of the mirror 188, that is reflected onto the mirror. The coordinate system is superimposed for explanation purposes and its center coincides with the center of the circle 200. The mirror 188 is wobbled at a fixed cyclic rate so that the viewing circle 202 is caused to move at a constant rate around the inside perimeter of circle 200. Thus at an arbitrary point in time light will be reflected onto the PM tube 158 when circle 202 has its center located at coordinates $X_aY_o$. In the preferred embodiment the circle 202 is moved in a counter-clockwise direction within circle 200, thus the center of 202 will be at the point X, Y, at some predetermined time depending on the rate at which the mirror 188 wobbled after the circle was at $X_aY_o$.

Thus, in operation, a reflected viewing area is achieved in that, due to the motion given to the mirror 188, a spot of reflected light appears to make revolutions around the circumference of the circle 200 through all four quadrants of the coordinate system at a definite cyclic repetition rate. Each circuit of the circumference of the circle by the scanning area constitutes a single scanning cycle. After each sweep the photoelectric head 62, under the control of the computer 28, will continue to move in a direction computed to bring the direction of movement of the scanning unit into coincidence with the direction taken by the line segment 204.

As the circle 202 rotates it intercepts the leading edge of the line segment 204 as at the point $N_1$. The line segment has been shown as having width in FIGURE 9 in that for practical purposes most drawn lines would have width on the dimensional scales chosen. At the point of interception of the scanning area with the line segment, the intensity of light along the optical path 172 will change and will produce an electrical pulse from the PM tube 158. The circular spot 202, in continuing to rotate, will eventually leave the line at its trailing edge $N_2$ and thus the intensity of light on the path 172 will change a second time to yield another electrical pulse. Likewise, during the scanning cycle, the light spot 202 must again intercept and leave the line segment 204 at the points $N_3$ and $N_4$ respectively and thus give off two more electrical pulses. When the spot has completed a full circuit of the circle, that is, has completed a scanning cycle, this fact may also be registered or indicated as a pulse of information and may be stored. This pulse is the reference pulse mentioned earlier and is obtained from the driving circuits for the mirror 188. These circuits will be described subsequently.

In the preferred embodiment, the mirror 188 operates at a frequency of 400 c.p.s., thus the circle 202 completes one revolution around the circle 200 in 2.5 msec. This period is divided into increments which represent points on the circle 201 described in circle 200 by the center point of the scanning circle 202. The number of increments chosen is a measure of the accuracy with which line segment 204 is located within circle 200. In the preferred embodiment, a clock operating at 500K c.p.s. is used to increment the circle 201 into 1,250 parts by utilizing the clock pulses to operate a plurality of counters indicated as the chord position registers 156 in FIGURE 7. When the scanning area 202 is at the zero point in a scanning cycle, that point being the point $X_oY_a$ in the coordinate system, the counters register a zero count. Thus, when the scanning area reaches the point $X_1Y_1$ this corresponds to a definite number of pulses outputted from the clock and to a corresponding positive count on the registers. When the scanning area 202 first intercepts the line 204 at $N_1$, a definite pulse will be given off by the PM tube 198 and at this point the chord position counters will have also received a discrete number of pulses from the clock corresponding to a definite number of increments on the circumference of the circle 201, described by the movement of the scanning circle 202. The pulse count is utilized as an indication of position of the leading edge of the line segment 204 in the circle 200. Likewise, the pulse counts achieved at the points $N_2$, $N_3$ and $N_4$ are registered and thus the four points of intersection of the line segment 204 with the circle 200 are determined and available for use by the computer.

The computer averages these points to calculate a straight line segment 206 which is an approximation of the center line of the line segment 204. The averaging is accomplished by the computer in a manner well known in the art. The computer 28 averages the numbers $N_1$ and $N_2$ to obtain a number $N_a$ which is representative of the intersection of the mid-point of the line segment 204 with the circumference of the circle 201 and is in actuality the difference in the arc lengths $N_1X_a$ and $N_2X_a$ divided by two. Likewise, the numbers $N_3$ and $N_4$ are averaged to produce a number $N_b$ which is equal to the mid-point of the arc defined by the difference of the arcs $N_3X_a$ and $N_4X_a$ divided by two to give the second point $N_b$ on the circle. A line 206 drawn through the points $N_a$ and $N_b$ will have, for all practical purposes, the exact direction of the line segment 204 and, because of the very small area viewed by the photoelectric head 62, is an excellent approximation of line segment 204. As stated previously, it is anticipated that the line 204 may turn through a sharp corner within the circle defined by the optical system, or may terminate within the circle 200, or may be broken within the circle 200, or may be intercepted by one or more lines within the circle 200. In all cases such as this, an ambiguity will exist and may be resolved as discussed previously.

The direction of the line segment 206 is in general the direction in which it is desired that the line follower travel. When the center of the circle 200 is not on the line segment 206, then an offset error E exists and is equal to the perpendicular distance between the line 206 and the center of the circle 200. Under these conditions, it is desirable and necessary that the photoelectric head be made to move along a line such as the line $N_dN_f$ to intercept the line 206. The line $N_dN_f$ necessarily must pass through the center of the circle 200. Line $N_dN_f$ is in the direction of line 206 and is inclined to line 206 forming an approach angle A with it. The size of the angle of approach A is related to the offset error E by a gain factor G which is dependent on the characteristics of the servos 140, 142, and other mechanical constants of the system. The line $N_fN_d$ is a fictional line stored in the memory of the computer 28. It must satisfy the following conditions:

$$\text{Arc } N_f - \text{Arc } N_d = 180°$$

and $$A = GE$$

The computer 28 will establish a new line $Nf_1Nd_1$ based upon the information read in as a result of data produced during any given scanning cycle. This is accomplished by computing the difference in the arcs $N_d-N_a$ and $N_f-N_b$ where the difference in the two arc lengths is related to and establishes a new approach angle $A_1$. The computer also sums the two arc lengths and divides by two to establish a chord length which is an approximation of the offset error E.

As has been stated, the scanning cycle starts from the point $X_aY_o$ which point is used by the computer to determine the coordinates of the center of the circle 200. Having obtained the offset error E as a chord length equal to the perpendicular distance from the center of the chord $N_aN_b$ the computer utilizes this information to compute the component errors $X_eY_e$ and causes this point to be recorded, as the center point of the circle in combination with the end points of the chord $N_aN_b$ and thus the drafting/digitizing apparatus in its digitizing mode avoids the problem of printing out hunting signals represented by such information as the exact position of the circle 200. The computer utilizes this information to calculate the new line $Nf_1Nd_1$ such that $A=GE$. These computations are easily handled by circuits well known in the computer art and therfore no further explanation of them is deemed necessary. When the line follower is operating in its automatic mode, the numbers including the variables described above are normally linear functions, but as E, the offset error number, approaches the radius of the viewing circle in length, the functions become non-linear. In such an event, directional line following correction information can be calculated by conventional nonlinear computer logic to adjust the direction of travel of the photoelectric head 62, and as an alternative an operator can switch the line follower to its manual mode of operation and, through the use of joy sticks at his console, free wheel the head 62 back into a linear tracking mode and then switch the line follower back to automatic.

It will of course be recognized by those skilled in the art that other methods of determining the position and direction of the line segment 204 within the area 200 can be used. For example, if the point $N_a$ represents a precise calibrated arc length, and if a second point within the circle 200 is known, then the component distances from the second point to $N_a$ are related to those two points and can be found if they were internally stored in the computer.

The above-described operations of the digitizing apparatus were given with respect to a line that was substantially straight. In most practical situations, wherein a user of this apparatus would desire to have a line followed to produce a punch tape or other form of output recording the lines that will be followed in many cases will be rounded or will have circular parabolic geometry. In most practical situations, the user of the digitizing apparatus will want the machine to operate as fast as it is practicably possible to produce a record of the geometric figure followed to a degree of accuracy compatible with the usual situation to which the record is to be applied. That is to say, the number of points $N_aN_b$ and other points determined by adding the center of circle 200 to the offset error coordinates $X_eY_e$ taken from the computer will determnie the degree of accuracy with which these lines aproach the line that is actually followed. Thus, the user may not want a deviation greater than two mils from the real line or for a one inch circle the allowable deviation may be no more than one mil. Thus, in actual practice, the computational registors of the computer 28 are programmed to print out or record those points that will remain within the user's tolerance requirements. In order to accomplish this, the computer may accept a plurality of points and as these points are accepted by its computational registers, it will utilize the points to determine the deviation taken by the line until a total computation equivalent to the tolerance level required has been achieved, at which point the computer will instruct the recorder 86 to print out that point at which the tolerence level was reached.

The above referred to line number computations are directed by the computer 28 to the interpolator 72 and the electronic controls 132, 134 for servos 140, 142 as a series of binary pulses which represent incremental distance movements along the X and Y axes as shown in FIGURE 5. This information is also clock controlled in the output of the computer 28 as to feed rate through the interpolator 72 and to serve the servo electronics, thus delta X and delta Y represent servo rate of change of direction or, that is, velocity ratios, and the distance of travel along the two axes in the same manner as described with respect to the drafting operation shown in FIGURE 6.

As stated heretofore, informational output is obtained by rotating and tilting the mirror 188 so that the photomultiplier 158 sees a viewing area that appears to regularly move around the circumference of the circle 200 seen by the lens 164.

Piezomotor

Referring now to FIGURES 10 and 11, one embodiment of a piezomotor 150 for the mirror 188 is shown in a side elevational view. The mirror 188 is rigidly affixed to one end of a pressure-electric bar 208. The piezobar 208 is a piezoelectric ceramic that will, when subjected to an electrical signal, flex or bend in a manner well known in the art; on the other hand, when a device of this type is flexed or bent, it will emit an electrical signal. Both principles ore utilized in the present invention for the purpose of wobbling the mirror 188. The piezobar 208 consists of a right circular cylinder of pressure-electric material supported within an insulative casing 210 for circular vibrational motion around two vibrational nodal points 212, 214, intermediate of the end points 188, the mirror end of the bar 208 and 216. The piezobar is coated with four longitudinally extending electrodes 218, 220, 222, and 224, placed at intervals of 90° around the circumference of the bar 208. These electrodes may be applied by any well known coating technique and in the preferred embodiment were coated along the entire length of the bar 208. A fifth ground electrode 226 is positioned coaxially along the center line for the entire length of the piezobar. Thus, electrical circuits can be established in the bar 208 from any of the four surface electrodes 218, 220, 222 and 224 to the grounding electrode 226.

The bar 208 is supported by a plurality of flexible electrical contacts 228, 229 along an axis arbitrarily designated as the Y axis where the contacts 228, 229 are in electrical conducting relationship with a pair of bar electrodes 218, 222. In a like manner, the bar 208 is supported for movement along the X axis by two pairs of contacts, not shown, electrically engaging electrodes 220, 224. The contacts electrically connect with the bar 208 at the nodal points 212, 214. Each contact 228 of each pair of contacts is separated from the contact 229 of the same pair by a distance equaling one half of the circumferential distance around the bar 208. The contacts 228, 229 are electrically connected to and supported by bus bars 230, 231 respectively where bus bars 230, 231 are anchored in and supported by a pair of insulative discs 232, 234. The discs 232, 234 are longitudinally displaced along the piezobar 208 and are supported within and by the casing 210. Support discs 232, 234 are provided with axial aligned bores 233 and 235 respectively within which the piezobar 208 is supported for movement. The bores must be large enough to allow the bar 208 to describe an ellipsoidal path. The support discs 232, 234 are maintained in fixed spaced apart relationship to one another by a pair of spacing bars 236, 238 which spacers may be made out of conductive material and utilized to link bus bars 230 and contacts 228 into a common electrical circuit and bus bars 231 and contacts 229 into a second common electrical circuit. Support disc 234 is anchored to casing 210 near end 216 of the piezobar 208 by suitable retaining means such as locking screw 240.

Casing 210 is internally threaded on one end to receive a threaded annular window holder 242. The holder 242 supports a window 244 which is axially aligned with mirror 188 and is utilized to protect mirror 188, the piezobar and piezobar amplifier electronics from dust and like contamination. The casing is supported on the other end in a second insulative casing 246. Casing 246 is provided with an annular recess in which casing 210 is seated whereby casing 210 is frictionally and rigidly attached to the casing 246. Casing 246 is provided with a central circuit cavity 248 into which bus bars 230 and 231 extend and into which spacer bars 236 and 238 may be extended. The circuit cavity 248 is utilized to stack a plurality of circuit boards 250, 252 in module form. The bus bars 230 and 231 and the spacing bars 237 and 238, when used as conductors, extend through and are connected with piezobar amplifier circuits on the boards 250, 252.

A second cavity 254 is provided in casing 246 as a wiring cavity whereby conductors may be linked up with circuit boards 250 and 252 through cable port 256 in order that external piezoelectric ceramic driver circuits are linked up with the piezobar amplifier circuits. Any suitable means such as connecting plug 258 threaded into casing 246 and communicating with cavity 254 may be utilized for circuit interconnections while maintaining the interiors of the circuit cavity and piezobar casing contamination free. In order to gain access to the cavities 248 and 254 and to remove the circuit boards and piezomotor as units, a backing plate 260 is removably supported in an annular recess 261 in the casing 246 and held there by a locking screw 262.

In operation, a driving signal of sinusodial shape is applied to bus bars 231 and thus to the piezobar electrodes through contacts 229. Assuming the signal to be such that it is zero and just starting positive, then the bar 208 will start to bend, due to the inherent properties of pressure electric materials, in the negative direction around the nodes 212, 214. This motion becomes more pronounced as the signal on electrode 222 becomes more positive. This action will cause the mirror 188 to tilt in the upward direction in that its placement is beyond the node 212. The mirror 188 continues its upward motion until it reaches a peak simultaneously with the signal on electrode 222 reaching a maximum whereupon the mirror reverses its tilting direction as the electrical input decreases. Obviously, if the polarity on electrode 222 is reversed, then the direction of tilting of mirror 188 will reverse along the Y axis.

Similarly, assuming the lack of a Y driving signal and a sinusoid input on the X drive electrode 224, then the mirror 188 is tilted into and out of the plane of the drawing shown in FIGURE 10. Thus, if the signal on the X drive electrode is a maximum in either the positive or negative direction and simultaneously the signal on the Y drive 222 is zero, then the mirror 188 will be tilted to a maximum into or out of the plane of the drawing. As the X driving signal decreases in magnitude the mirror will decrease its angle of tilt into or out of the plane of the paper. If at the time the signal on the X electrode is increasing and if at the same time the Y drive is receiving an increasingly positive signal, then the mirror 188 will tilt into or out of the plane of the paper and upward or downward simultaneously around node 212. It is believed from the foregoing description that it will be obvious to those skilled in the art that when the signals on the driving electrodes are separated in phase by 90° that the motion of the circumference of the mirror will be rotational and this is due to the tilting action given to the mirror 188 by the piezobar 208. Thus it should be obvious that with this sort of drive applied to the bar 208 the area 202 on the circumference of the circle 200 imaged on the mirror 188 and brought into alignment with the pinhole diaphragm along the path 172 will be progressively moving in a time varying manner and appears as a scanning circle moving at a steady cyclic rate around the circumference of the circle 200.

As the bar 208 flexes it will generate an electrical signal which signal is impressed upon contacts 228 from the electrode 218 for the Y axis and the contacts, not shown, for the electrode 220 for the X axis. This signal is utilized for driving purposes in the crystal drive unit's electronics, and is also utilized as a reference signal.

Referring now to FIGURE 12, the driving circuits for the piezomotor 150 are shown in block diagram form. The piezobar 208, as has been discussed previously, is provided with four electrodes, 218, 220, 222, 224, separated from each other by 90° of rotation around the circumference of the bar 208 and a fifth common electrode 226 coated on the inside base of the bar 208. The common electrode is grounded. Electrode 218 is connected through its bus bars to the input of the drive unit electronics over line 264; this electrode was arbitrarily chosen as on the Y axis. Similarly, X sense electrode 220 is connected to the drive electronics over input line 266. Input line 264 is connected to the input of a Y signal phase shifting network 268, to an emitter follower 270, the operation and purpose of which will be described subsequently. An X signal phase shifter 272 is connected to the Y signal phase shifter 268 over line 271. The X sensing line input 266 is connected to an AGC control 274 for the X axis drive control. Automatic gain control for the Y drive circuit is achieved by tapping phase shifter 268 in the Y drive network with an AGC circuit 275. Phase shifters 268 and 272 shift the signal impressed upon their inputs by 90° and this signal is amplified in a pair of power amplifiers where a power amplifier 278 is connected to the output of phase shifter 268 and a second power amplifier 280 is connected to the output of phase shifter 272. AGC controls 274, 276 are also applied to the power amplifiers 278, 280. The output of power amplifier 278 is applied over line 282 to the Y axis drive electrode 222. The output of power amplifier 280 is applied over line 284 to the X axis drive electrode 224.

Phase shifters 268, 272 receive as input signals sine waves representative of the flexed or bending state of the piezobar 208. These signals are shifted in phase by 90° in phase shifter 268 and applied after amplification as Y drive signals over line 282. At the same time, in the preferred embodiment, the output of phase shifter 268 is applied to the input of phase shifter 276 where the signal is shifted another 90° in phase and is applied as X drive over line 284. Thus the signals on the output lines are 90° out of phase with the inputs to the phase shifter and 90° out of phase with each other, and therefore wobbling motion is imparted to the mirror 188. Assuming the instantaneous point sensed on the electrode 218 is a zero and a maximum negative signal has been sensed on the electrode 220, then a shift of 90° along each axis means next drive X pulse is a zero and the next drive Y pulse is a maximum positive. In actual practice, these static conditions of zero and maximum output occur instantaneously and thus pulses are always available for driving the piezobar 208 into different vibrational modes.

As has been explained heretofore, it is necessary that the computer 28, FIGURE 1, be oriented with respect to the circle 200 under the lens system 166 so that the computer will know when a scanning cycle has started and when it is finished or, that is, it must know where the informational output is located relative to a coordinate system superimposed on the circle 200. Any reference point may normally be chosen but in the preferred embodiment of the invention, X maximum positive, Y zero ($X_aY_0$) on a Cartesian coordinate system was chosen for this purpose. Thus, in FIGURE 12, the emitter follower 270 is connected to the electrode 218 to provide an output signal indicative of a Y zero condition. This signal is squared in pulse shaper 154 and transferred to a shift register, to be described below through a second emitter follower 286. It is pertinent to note at this point that since the output of the piezobar 208 is a sine wave, the output of a pulse shaper 154 will be a square wave having the periodicity of the since wave and will be in phase with the sine wave. Thus, the shift register or counter triggered by the squared wave can be set to stop counting when the trailing edge of the pulse is received and can be utilized to transfer information to the computer. This information is utilized to orient the computer as to the position of informational pulses on the circumference of the circle 200.

Referring now to FIGURE 13, the electronics of the piezoelectric ceramic driver unit are shown in schematic form. The complete subcircuits shown in block form in FIGURE 12 are shown and contained within the dashed boxes of FIGURE 13. All circuits shown in FIGURE 13 are transistorized but, of course, equivalent circuits could be substituted utilizing vacuum tubes and, of course, the transistors shown as NPN devices could have PNP circuits substituted for those shown and NPN circuits could be substituted for the PNP circuits shown.

The phase shifter 268 connected to line 264 comprises a split load phase inverter 288 having conventional bias circuitry and having outputs fed from the collector and emitter of a transistor 290 to an RC phase shifting circuit 292 located in the input circuit of a conventional emitter follower 294. The RC time constants in the base circuit of emitter follower 294 are such that the output of the split load phase inverter 288 is shifted in phase by 90°. The output of inverter 288 is also applied to the input of a silicon bridge rectifier 296 to develop a DC signal to be applied to the emitter of a field effect transistor 298 for automatic gain control purposes.

The output signal from the emitter follower 294 is developed across a Y gain setting potentiometer 300 and applied as an input signal to the first stage of the two stage cascaded power amplifier 278. The power amplifier 278 utilizes two cascaded stages 302, 304, of power amplification in order to obtain two phase reversals of the signal applied to the base of amplifier 302 so that the signal on Y drive line 282 is in phase with the output of the phase shifter 288, and the use of two stages of power amplification, of course, increases the driving power to the piezobar.

Both power amplifier stages utilized conventional biasing networks and coupling networks and no further explanation of them is deemed necessary.

The signal developed across the gain setting potentiometer 300 is applied as a signal source to a series circuit consisting of the resistor 306 and the two bases of the FET 298. The output of the inverter 288 is applied to the bridge rectifier 296 to produce full wave rectification of the signal. The rectified signal is impressed across the emitter and grounded base of the FET for bias purposes. The FET thus is made to act like an automatic potentiometer in that by changing the emitter bias the impedance between the emitter and grounded base is varied to cause the impedance from the ungrounded base to ground to change. In this manner the voltage drop across the FET is varied in accordance with the amplitude of the applied emitter bias. As a gain regulator the RMS value of the signal developed across the FET remains essentially constant in that as the emitter bias decreases the impedance of the FET increases causing the voltage drop across the two bases to remain the same. Conversely, if the signal input to the bridge increases, the impedance of the FET decreases, thus decreasing the voltage drop across the two bases causing the output to remain constant. The voltage developed across the FET is applied as an input signal to the first stage 302 of the power amplifier 278.

Thus, it will be obvious to those skilled in the art that the amplitude of signal applied to the input of the power amplifier will, within the operating limits of the automatic voltage control circuit, be approximately the same except for the inherent signal attenuating effects of the circuitry employed and will differ from the input signal applied to the drive circuit by a shift in phase of 90°

X axis drive is obtained by slaving the phase shifter 272 to the output of emitter follower 294 in the Y phase shifter circuit 268. This method of obtaining drive for the X drive electrode 224 was adopted in the present embodiment for epediencey; methods such as the duplication of Y drive circuits could have been utilized but this would have required phase comparison circuits to insure a 90° phase separation between the X and Y drivers. The phase shifter 272 is similar in operation and construction to that described above with respect to the phase shifter 268. A split load phase inverter 308 has signal input applied to its base from a connection taken at a junction 310 of the emitter of emitter follower 294 and potentiometer 300. The output of the phase inverter 308 is applied to both ends of an RC phase shifter consisting of capacitor 312 and rheostat 314. Thus, by slaving the X driver to the Y driver a 90° phase separation between the two drive signals is easily obtained by adjusting rheostat 314 and therefore adjusting the time constant of the X drive phase shifter. The X drive signal is phase shifted by 90° and is applied to the base of an emitter follower 316. The output signal of the emitter follower 316 is developed across an X axis gain setting pot 318 and is applied to base 2 of an FET 320 in the AGC circuit 274 of the X driver and to the input of power amplifier 280 which consists of two cascaded stages 322, 324 of power amplification and is similar in operation to power amplifier 278 described above.

DC input for FET emitter control is obtained by applying the signal sensed on electrode 220 over line 266 to the base of a split load phase inverter 326 for the purpose of developing a drive signal to the inputs of a silicon bridge rectifier 328. The output of the bridge rectifier 328 is a DC signal which is applied to the emitter of the FET 320. Base 2 of the FET 320 is connected to potentiometer 318 through resistor 320 and automatic gain control is achieved in the same manner as described above with respect to the Y drive AGC stage 276. The amplified phase shifter X drive signal is applied over line 284 to electrode 224.

As mentioned previously, the output of piezobar 208 is sinusodial and is utilized to orient the computer 28 as to the position of a line within the viewing circle 200 imaged by the lens system 166. For the purpose of providing this signal to the computer, the Y sense electrode 218 is connected to the input of the emitter follower 270. The bias circuits for the emitter follower are conventional. The output signal of the follower is developed in emitter resistor 332 and applied over line 334 to the input of a squaring circuit, which may be a conventional Schmitt trigger, 154. The squared signal in the output of the Schmitt trigger is applied to the input registers of computer 28 through emitter follower 286.

Referring now to FIGURE 14, the input circuits from the photomultiplier 158 for the computer 28 are shown in block diagram form. The output of the PM tube 158 consists of a series of pulses where each pulse represents a change in light value on the target 196 of the PM tube 158. As has been explained, these changes occur every time the scanning spot 202 intercepts the line being followed and again when the scanning spot leaves the line. The computer input circuits are designed so that they will accept and register the output of the photomultiplier whether that output is produced by a dark line located on a light reflecting surface or a light reflecting line located on a light absorbing surface or a line representing a transitional state between two bodies having different light reflecting properties. The output of the photomultiplier is applied to a squaring circuit 160 which may consist of a conventional Schmitt trigger. Other pulse producing circuits could be readily substituted for the Schmitt trigger used in the preferred embodiment. The squarer 160 is utilized for the purpose of shaping the pulses produced by the photomultiplier 158 into a squared wave form so that they may be used to trigger binary circuits.

The squared output of the pulse shaper 160 is applied after current amplification in a pair of emitter followers 336, 338 to the chord position register 156 through a discriminator 340 and stepping switch 342. The chord position register 156 consists of five shift registers 344, 346, 348, 350, and 352 which may be of any conventional shift register design such as a ring of flip flops, SCRs or the like, and are used as counters. The stepping switch 342 applies the squared output of the multiplier to each of four of the shift registers 344, 346, 348, and 350 in time sequence. In the preferred embodiment, five counters are employed in that five signals are contemplated, four of which are generated by the viewing area 202 when the circle crosses a line located within the circle 200 as seen by the lens system 166; the fifth signal is generated when the viewing area 202 completes one scanning cycle, the signal is produced on line 334. The discriminator 340 is utilized for the purpose of moving the input on the chord position register 156 to the counter 346 as the starting counter when the special circumstance of the line segment 204, see FIGURE 9, lies on the X axis or partially on the X axis so that a scanning cycle commences with the viewing area 202 located on or within the line segment. In that it is contemplated that in normal operation as stated heretofore, the viewing area 202 would first intercept the line segment 204 at some other position in the circle 200 and assuming a normal situation of a line segment being of a dark color on a light background, then in that case, the change in light intensity on the target 196 of the photomultiplier would be to decrease intensity, and correspondingly the counter 344 has been in the preferred embodiment set up to handle a pulse representative of that condition. In a like manner, the counter 346 has been, in the preferred embodiment, set up to handle information corresponding to a change in light intensity on the target of the photomultiplier from dark to light, or that is, as the viewing area 202 leaves the line segment 204. In the special case, i.e., the line segment on the X axis, the first pulse that would be generated on the target of the photomultiplier would correspond to the information for which counter 346 has been designed to handle, and thus it is necessary that this first pulse be directed through the stepping switch 342 to counter 346. The discriminator 340 is utilized for the purpose of discriminating between the two pulses of different polarity outputed from the photomultiplier, thus if the first pulse is indicative of a condition of dark to light the discriminator will cause the stepping switch 342 to advance one position so that the first pulse would be inputed to counter 346. The second pulse would then be indicative of the number or position $N_3$ described with respect to FIGURE 9 and would be entered into counter 348; the last pulse would then be entered into counter 344 and would correspond to the number $N_1$.

The computer 28 is able to handle the directional and positional problems involved with the special case, in that the number $N_1$ would have a count indicating that it lies in the fourth quadrant of the Cartesian system. The other input on each of the counters is taken in common from line 354 which is the output line of an AND gate 356. AND gate 356 is connected to a computer clock 358 operating, in the preferred embodiment, at 500K c.p.s. which is utilized to generate a series of pulses which when passed by the gate cause all of the shift registers to start counting. In the absence of a pulse applied from the photomultiplier, the counters will constantly step the clock pulses around their respective rings. Each counting element of the counters 344–352 represents a discrete point on the circumference of the circle 200 and thus each counter can be individually commanded to stop counting at a point on the circumference by a stop pulse applied to its other input; this pulse can be utilized to cause readout from the counters into the computer. The second input to the AND gate 356 represents a zero reference command from the computer 28 which is utilized to start a counting operation. The output of the counters are applied serially to the computer 28 which interrogates each counter individually and in sequence to read out accumulated counts.

Assuming that computer 28 has applied a zero reference input to the AND gate 356, then the gate will open and the counters will commence counting in accordance with the pulse rate of the clock. The first pulse output of the PM tube 158 is applied in the normal case by the switch 342 to first counter 344 thus causing it to stop counting after having stored a specific number of pulses from the clock, which number of pulses indicate a specific point on the circumference of the circle 200 and are coincident with the first interception by the scanning area 202 with the line being followed. In a like manner, the counter 346 will stop counting upon the arrival of a second pulse and so on until finally at the termination of a complete scanning cycle, the piezoelectric ceramic driving unit will generate a pulse, the trailing edge of the square wave, over the reference line 334 to cause the counter 352 to stop counting. The total counts registered are then available for readout by the computer 28 which, after readout, will reset all counters to zero.

Since in the preferred embodiment, the photomultiplier 158 has been set to give a positive signal output in the event a dark line segment on a light reflecting background has been intercepted by the scanning spot, then if the situation is reversed or, that is to say, the line containing area under observation has a light absorbing background and the line being followed is light reflecting, the output from the photomultiplier tube would be negative in phase with respect to the normal situation. In this event, since the circuits employed have been chosen so as to register with respect to positive pulses on their input and since no phase inversion has been incorporated in that emitter follower stages have been employed, it is necessary to use a phase inverter 360 between the output of the emitter follower 336 and the input of the shift registers 156. For this purpose, the operator is provided with a switch 362 at his console so that he may discriminate between the two situations and set the computer input circuits up for proper operation.

Since the computer 28 has clear or empty storages when a counting cycle is started and since it knows relative to counter 352 when the counting and hence scanning cycle was completed, the computer can utilize the information stored in the counters to compute the actual position and direction of the line within the circle 200 and use this information to operate the recorder 86 to make a permanent record of it. This information is also utilized in combination with the information accumulated by the incremental accumulator 162, FIGURE 7, to determine the direction in which the photoelectric head 62 should travel and this latter information is read into the interpolator 72 for the purpose of generating a binary pulse train which is utilized after conversion by the servos 140, 142 to move the photoelectric head 62.

The computer 28 will start to read out the information contained within the counters once they have been completed counting, or, in the alternative, as they individually complete a counting operation. But since the computer requires time to perform calculations, it is not possible for the computer to take as an input all points seen by the line follower 62. The follower is, during the interval, continuing its scan of the line being followed and this information will not be registered in the chord position register 56 until the computer has used all information stored in the register during the previous scanning cycle. In the preferred embodiment of this invention, the time necessary for the computer to read the information out of the shift registers was approximately 2.5 times the inverse of the repetition rate of the clock 358. This time is sufficient for the line follower to advance under the operation of its drive serves to the next most significant point for receiving information, assuming minimum tolerance requirements. During the interval that the computer is reading out information from the counters, they cannot accept new pulse signals from the photomultiplier tube 158 in that the AND gate 356 is closed and therefore the counters are closed off from clock 358. Once the computer has finished readout, it will reset the counters to zero and start a new information scanning cycle.

From the foregoing description of the preferred embodiment of the invention and alternative constructions mentioned, it will be apparent that the objects of the invention heretofore enumerated and others have been accomplished. While the preferred embodiment of the invention has been described in considerable detail, it is to be understood that alternative constructions and arrangements may be employed, for example, alternative drive circuits could be employed in the piezoelectric ceramic driver, a telescope monitor could be substituted for the TV monitor, the sources of manual input information and servo drives could be absolute rather than incremental digital data types, etc.

It is the intention to hereby cover all embodiments of the invention which come within the practice of those skilled in the art to which it relates and the appended claims.

Having described our invention, we claim:

1. A drafting, digitizing machine for drafting on sheet-like articles, and for producing digital records of markings carried on sheet-like articles comprising:
   (a) means for supporting said sheet-like articles;
   (b) means mounted on said supporting means for controllably drafting lines and the like on a sheet-like article;
   (c) photoelectric means mounted on said supporting means for scanning a sheet-like article to generate electrical signals indicative of the position and direction of markings impressed on or in said sheet-like article;
   (d) powered motive means for moving said drafting means and said scanning means over said sheet-like articles;
   (e) a plurality of sources of digital information;
   (f) computer means responsive to said plurality of sources of digital information for utilizing said digital information to produce a plurality of command signal outputs;
   (g) means connected to and responsive to said computer means for controllably energizing said powered means; and
   (h) a plurality of output indicting devices connected to said computer for producing records of the operation of said powered means, said drafting means, and said scanning means.

2. A drafting, digitizing machine for drafting on sheet-like articles, and for producing digital records of markings carried on sheet-like articles comprising:
   (a) means for supporting said sheet-like articles;
   (b) means mounted on said supporting means for controllably drafting lines and the like on a sheet-like article;
   (c) means mounted on said supporting means for scanning a sheet-like article to generate electrical pulses indicative of the position and direction of markings impressed on or in said sheet-like articles, and to produce an optical image of a portion of said markings;
   (d) powered means for moving said drafting means and said scanning means over said sheet-like articles;
   (e) a plurality of sources of digital information;
   (f) computer means responsive to said plurality of sources of digital information for utilizing said digital information to produce a plurality of command signal outputs;
   (g) means connected to and responsive to said computer means for controllably energizing said powered means; and
   (h) a plurality of output devices connected to said computer for producing records of the operation of said powered means, said drafting means, and said scanning means.

3. A drafting, digitizing machine for drafting on sheet-like articles, and for producing digital records of markings carried on sheet-like articles comprising:
   (a) means for supporting said sheet-like articles;
   (b) means mounted on said supporting means for controllably drafting lines and the like on a sheet-like article;
   (c) a photoelectric scanning unit supported relative to a sheet-like article having markings thereon by said supporting means for generating pulse signals indicative of the position and direction of said markings on said article, and for generating a television picture of a portion of said article;
   (d) powered means for moving said drafting means and said scanning means over said sheet-like articles;
   (e) a plurality of sources of digital information;
   (f) computer means responsive to said plurality of sources of digital information for utilizing said digital information to produce a plurality of command signal outputs;
   (g) means connected to and responsive to said computer means for controllably energizing said powered means; and
   (h) a plurality of output devices connected to said computer for producing records of the operation of said powered means, said drafting means, and said scanning means.

4. A drafting-digitizing machine for drafting on sheet-like articles, and for producing digital records of markings carried on sheet-like articles comprising:
   means for supporting said sheet-like articles;
   a scribing-scanning means including a photoelectric member mounted on said supporting means for controllably drafting lines and the like on a sheet-like article and for scanning a sheet-like article to generate electrical signals indicative of the position and direction of markings impressed on or in said sheet-like article;
   motive powered means for moving said scribing-scanning means over said sheet-like articles;
   computer means for processing digital information to provide a plurality of output signals including command signals for said motive powered means and command signals for said scribing-scanning means;
   at least two sources of digital information connected to inputs of said computer, the information provided by said sources being utilized by the computer to provide said output signals;
   data processing and signal conversion means connected to said computer and to said motive powered means for utilizing command signals from said computer to controllably energize said motive powered means; and
   output means connected to said computer for utilizing output signals from said computer to provide records of the operation of said powered means, said drafting means, and said scanning means.

5. A drafting-digitizing machine for drafting on sheet-like articles, and for producing digital records of markings carried on sheet-like articles comprising:
   means for supporting said sheet-like articles;
   a scribing-scanning means including a photoelectric member mounted on said supporting means for controllably drafting lines and the like on a sheet-like article and for scanning a sheet-like article to generate electrical signals indicative of the position and direction of markings impressed on or in said sheet-like article;
   motive powered means for moving said scribing-scanning means over said sheet-like articles;
   computer means for processing digital information to provide a plurality of output signals including command signals for said motive powered means and command signals for said scribing-scanning means;
   at least two sources of digital information connected to inputs of said computer, one of said sources including the photoelectric member of said scribing-scanning means, the information provided by said sources being utilized by the computer to provide said output signals;

data processing and signal conversion means connected to said computer and to said motive powered means for utilizing command signals from said computer to controllably energize said motive powered means; and output means connected to said computer for utilizing output signals from said computer to provide records of the operation of said powered means, said drafting means, and said scanning means.

6. A digitizing machine for following a line drawn on a sheet-like article to produce useable information regarding the position and direction of said line on said article comprising: means for supporting said article; means mounted on said support means including a photoelectric member for observing a discrete area of said article and for producing electrical signals representative of the position and direction of said line in said discrete area; means, including motive power members, connected to said observing means for moving said observing means over said article; means connected to said observing means for temporarily storing said electrical signal; computer means connected to said temporary storage means and to said means for moving said observing means, said computer utilizing said electrical signal to produce at least two output signals, one of which is applied to said means for moving said observing means; and means connected to said computer means for recording the other of said computer output signals.

7. A digitizing machine for following a line drawn on a sheet-like article to produce digital information regarding the position and direction of said line comprising: means for supportng said article; means including a photoelectric member for observing a discrete area of said material and for producing electrical signals representative of the position and direction of said line in said discrete area; means, including motive power members, connected to said observing means for moving said observing means over said article; means, including a plurality of counting devices, connected to said observing means for temporarily storing said electrical signals; computer means connected to said temporary storage means and to said means for moving said observing means, said computer means including means for initiating counts by said counters in said temporary storage means, said computer utilizing said electrical signals to produce at least two output signals, one of which is applied to said means for moving said observing means; and means connected to said computer means for recording the other of said computer output signals.

8. A digitizing machine for following a line drawn on a sheet-like article to produce digital data of the position and direction of said line comprising: means for supporting said article; means mounted on said supporting means, including a photoelectric member, for observing a discrete area of said material, to generate a first set of signals representative of said discrete area, and to generate a second set of signals representative of the position and location of a line in said discrete area; means connected to said observing means for using said first set of signals produced by said observing means to generate a visual picture of said discrete area; means, including motive power members, connected to and supporting said observing means for moving said observing means over said line bearing material; means, including a plurality of counting devices, connected to said observing means for temporarily storing said second set of said signals; computer means connected to said temporary storage means and to said means for moving said observing means, said computer means including means for initiating counts by said counters in said temporary storage means, said computer utilizing said second set of signals to produce at least two output signals, one of which is applied to said means for moving said observing means; and means connected to said computer means for recording the other of said computer output signals.

9. A digitizing machine for automatically following a line drawn on a sheet-like article to produce digital data of the position and location of said line on said article comprising: means, including a control panel having a TV receiver mounted in it, for changing the operation of said digitizing machine from automatic to manual control; means for supporting said article; means mounted on said supporting means, including a photoelectric member, for observing a discrete area of said article to generate a first set of signals representative of said discrete area; and to generate a second set of signals representative of the position and location of a line in said discrete area; means connected to said observing means for using said first set of signals for displaying a visual picture of said discrete area, said visual picture being displayed at said control panel on said TV receiver; means, including motive power members, connected to and supporting said observing means for moving said observing means over said article; means, including a plurality of counting devices, connected to said observing means for temporarily storing said second set of said signals; computer means connected to said temporary storage means and to said means for moving said observing means, said computer means including means for initiating counts by said counters in said temporary storage means, said computer utilizing said second set of signals to produce at least two output signals, one of which is applied to said means for moving said observing means; and means connected to said computer means for recording the other of said computer output signals.

10. A digitizing machine for automatically following a line drawn on a sheet-like article to produce digital data of the position and direction of said line on said article comprising: means including a table for supporting said article, said table supporting a plurality of beams so that said beams form at least two axes of a numeric coordinate system; means mounted on said supporting means including a photoelectric member for observing a discrete area of said article and for producing electrical signals representative of the position and direction of said line in said discrete area; a plurality of individually powered moveable carriages supported on said beams, each of said carriages being powered by a servo motor mounted on the carriage, said observing means being attached to one of said carriages; said servo motors being keyed to said beams for incrementally stepping said moving and supporting members along said beams; means, including a plurality of counting devices, connected to said observing means for temporarily storing said electrical signals; conversion means operatively connected to said servo motors for energizing and driving said servo motors; computer means connected to said temporary storage means and to said conversion means; said computer means including means for initiating counts by said counters in said temporary storage means, said computer utilizing said electrical signals to produce at least two output signals, one of which is applied to said conversion means as power information for said servo motors; and means connected to said computer means for recording the other of said computer output signals.

11. A digitizing machine for automatically following a line drawn on a sheet-like article to produce digital data representative of the position and direction of said line on said article comprising: means for supporting said article; photoelectric means including a TV camera for observing a discrete area of said line bearing material along two optical paths, said TV camera being located in one of said optical paths to produce a visual image of said discrete area, the other of said optical paths being utilized to produce electrical pulse information indicative of the position and direction of a line within said discrete area; means, including motive power members supported by said article supporting means for supporting said photoelectric means relative to said article; means, including a pulse shaper and a pulse counter connected to said photoelectric means for temporarily storing said electrical signals; computer means connected to said temporary storage means and to said means for moving said photoelectric means, said computer means including means for initiating a count by said counter in said temporary storage means, said computer utilizing said electrical signals to produce at least two output signals, one of which is applied to said means for moving said photoelectric means; and means connected to said computer means for recording the other of said computer output signals.

12. A digitizing machine for automatically following a line drawn on a sheet-like article to produce digital data representative of the position of said line on said article comprising: means for supporting said article; a photoelectric head for optically observing a discrete area of said line bearing material, a lens system mounted in said photoelectric head to form an optical path terminating in a photomultiplier tube, said lens system including optical means for scanning said discrete area and for producing electrical pulses in said photomultiplier tube whenever said optical means intercepts a line contained within said discrete area; means including an electrical pulse counter connected to said photomultiplier tube for temporarily storing said electrical pulses; means, including motive power members supported by said article supporting means for supporting said photoelectric head over said article, and for moving said photoelectric head relative to said article; transducer means mounted on said means for moving said photoelectric head for generating pulses representative of the distance of, direction of, and rate of travel of said photoelectric head; a tape typewriter; computer means connected to said temporary storage means, to said transducer means, and to said tape typewriter for utilizing said temporary storage means, said transducer means and said tape typewriter as digital input sources; means connected to said computer and to said means for moving and supporting said photoelectric head for controlling the movement of said photoelectric head over said article in response to information processed in said computer; and a recorder operatively connected to said computer for producing a permanent record of the position and direction of said line on said article in response to information processed in said computer.

13. A device for following a line on a sheet-like article and for generating and storing information representative of the position and direction of the line comprising: photoelectric means, including an optical probe, for scanning an area of said article and for producing electrical signals representative of the position and direction of a line in said area, said optical probe including a self-contained independent cyclically moving scanning element for optically defining said scanning area, and to optically indicate the position and direction of a line in the scanning area; transfer means including a plurality of registers connected to said photoelectric means for temporarily storing said electrical signals, said transfer means including a pulse shaper to square said signals prior to entry into said registers; computer means connected to said transfer means for processing said signals; means connected to said computer means for making a permanent record of said signals representative of the position and direction of said line in said area; and output means, including a signal interpolator, connected to and responsive to said computer for controlling the movements of said photoelectric means over said sheet-like article.

14. A drafting-digitizing machine for drafting on sheet-like articles, and for producing digital records of markings carried on sheet-like articles comprising:
means for supporting said sheet-like articles;
a scribing-scanning means including a photoelectric member mounted on said supporting means for controllably drafting lines and the like on a sheet-like article and for scanning a sheet-like article to generate electrical signals indicative of the position and direction of markings impressed on or in said sheet-like article;
motive powered means for moving said scribing-scanning means over said sheet-like articles;
computer means for processing digital information to provide a plurality of output signals including command signals for said motive powered means and command signals for said scribing-scanning means;
at least three sources of digital input information connected to inputs of said computer means, the information provided by said sources being utilized by said computer means to provide the output signals, one source being associated with said motive powered means to provide feedback information concerning the position of said means relative to said sheet-like articles, and a second source including the photoelectric member of said scribing-scanning means to provide information concerning the direction and position of a marking on said sheet-like article;
data processing and signal conversion means connected to said computer and to said motive powered means for utilizing command signals from said computer to controllably energize said motive powered means; and
output means connected to said computer for utilizing output signals from said computer to provide records of the operation of said powered means, said drafting means, and said scanning means.

15. A drafting-digitizing machine for drafting on sheet-like articles, and for producing digital records of markings carried on sheet-like articles comprising:
means for supporting said sheet-like articles;
a scribe-scan head mounted on said supporting means, said head including stylus means for drafting lines and the like on a sheet-like article, and photoelectric means for providing digital information concerning the position and direction of lines on said article;
motive powered means for moving said scrib-scan head over said sheet-like articles;
computer means for processing digital information to provide a plurality of output signals including command signals for said motive powered means and command signals for said scribe-scan head;
at least two sources of digital information connected to inputs of said computer means, one of said sources including the photoelectric means of said scribe-scan head, the information provided by said sources being utilized by the computer to provide said output signals;
data processing and signal conversion means connected to said computer and to said motive powered means for utilizing command signals from said computer to controllably energize said motive powered means; and
output means connected to said computer for utilizing output signals from said computer to provide records of the operation of said powered means, said stylus means, and said photoelectric means.

16. A drafting-digitizing machine for drafting on sheet-like articles, and for producing digital records of markings carried on sheet-like articles comprising:
means for supporting said sheet-like articles;
a scribe-scan head mounted on said supporting means, said head including stylus means for drafting lines and the like on a sheet-like article, and photoelectric means for providing digital information concerning the position and direction of markings on said article, and for providing an optical image of a segment of a marking on said article;
computer means for processing digital information to provide a plurality of output signals including command signals for said motive powered means and command signals for said scribe-scan head;

at least three sources of digital input information connected to inputs of said computer means, the information provided by said sources being utilized by said computer means to provide the output signals, one source being associated with said motive powered means to provide feedback information concerning the position of said means relative to said sheet-like articles, and a second source including the photoelectric means of said scribe-scan head to provide information concerning the direction and position of a marking on said sheet-like article;

data processing and signal conversion means connected to said computer means and to said motive powered means for utilizing command signals from said computer to controllably energize said motive powered means;

first output means connected to said computer for utilizing output signals from said computer to provide records of the operation of said powered means, said stylus means, and said photoelectric means; and second output means associated with said photoelectric means for utilizing said optical image provided by the said means to form a television picture of said image.

17. A drafting-digitizing machine for drafting on sheet-like articles, and for producing digital records of markings carried on sheet-like articles comprising:

means for supporting said sheet-like articles;

a scribe-scan head mounted on said supporting means, said head including stylus means for drafting lines and the like on a sheet-like article, and scanning means for generating at least two sets of signals, said scanning means including an optical system for forming an image of a portion of a marking on said article along two optical paths, first photoelectric means positioned along one of said optical paths for generating digital signals representing the position and direction of said marking, and means positioned along the other of said optical paths for transmitting said image to a machine control station;

computer means for processing digital information to provide a plurality of output signals including command signals for said motive powered means and command signals for said scribe-scan head;

at least two sources of digital information connected to inputs of said computer means, one of said sources including the photoelectric means of said scribe-scan head, the information provided by said sources being utilized by the computer to provide said output signals;

data processing and signal conversion means connected to said computer means and to said motive powered means for utilizing command signals from said computer to controllably energize said motive powered means;

first output means connected to said computer for utilizing output signals from said computer to provide records of the operation of said powered means, said stylus means, and said photoelectric means; and second output means located at said machine control station for using said transmitted optical image.

18. A drafting-digitizing machine for drafting on sheet-like articles, and for producing digital records of markings carried on sheet-like articles comprising:

means for supporting said sheet-like articles;

a scribe-scan head mounted on said supporting means, said head including stylus means for drafting lines and the like on a sheet-like article, and scanning means for generating at least two sets of signals, said scanning means including optical means for providing an image of a portion of a marking on said article along two optical paths, first photoelectric means positioned along one of said optical paths for generating digital signals representing the position and direction of said marking and second photoelectric means positioned along the other of said optical paths for generating electrical analog signals of said image;

computer means for processing digital information to provide a plurality of output signals including command signals for said motive powered means and command signals for said scribe-scan head;

at least two sources of digital information connected to inputs of said computer means, one of said sources including the photoelectric means of said scribe-scan head, the information provided by said sources being utilized by the computer to provide said output signals;

data processing and signal conversion means connected to said computer means and so said motive powered means for utilizing command signals from said computer to controllably energize said motive powered means;

first output means connected to said computer for utilizing output signals from said computer to provide records of the operation of said powered means, said stylus means, and said photoelectric means; and second output means associated with said second photoelectric means for utilizing said analog signals to generate a television picture of said image.

References Cited

UNITED STATES PATENTS

| | | | |
|---|---|---|---|
| 3,366,934 | 1/1968 | Kelsey | 340—172.5 |
| 3,369,163 | 2/1968 | Peterson et al. | 318—20.130 |
| 3,217,220 | 11/1965 | Morris | 318—20.130 |
| 3,217,219 | 11/1965 | Muldoon | 318—20.130 |
| 3,215,914 | 11/1965 | Patterson | 318—20.155 |
| 3,188,541 | 6/1965 | Eisengrein et al. | 318—20.110 |
| 3,167,656 | 1/1965 | Toulmin | 318—20.155 |
| 3,050,669 | 8/1962 | Moseley et al. | 318—20.155 |
| 3,004,166 | 10/1961 | Greene | 318—20.155 |
| 2,678,496 | 5/1954 | Martin | 318—20.155 |
| 2,532,421 | 12/1950 | Rathje | 318—20.155 |

GARETH D. SHAW, Primary Examiner

U.S. Cl. X.R.

318—20.105